United States Patent
Ouyang et al.

(10) Patent No.: US 10,592,995 B1
(45) Date of Patent: Mar. 17, 2020

(54) METHODS, SYSTEMS, AND COMPUTER PROGRAM PRODUCT FOR PROVIDING EXPENSE INFORMATION FOR AN ELECTRONIC TAX RETURN PREPARATION AND FILING SOFTWARE DELIVERY MODEL

(71) Applicant: INTUIT INC., Mountain View, CA (US)

(72) Inventors: Peter P. Ouyang, Del Mar, CA (US); Christopher R. Rivera, Carlsbad, CA (US); Joseph B. Cessna, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 288 days.

(21) Appl. No.: 15/417,861

(22) Filed: Jan. 27, 2017

(51) Int. Cl.
*G06Q 40/00* (2012.01)

(52) U.S. Cl.
CPC .................. *G06Q 40/123* (2013.12)

(58) Field of Classification Search
CPC ...... G06Q 20/10; G06Q 40/00; G06Q 40/123; G06F 17/243
See application file for complete search history.

(56) References Cited

U.S. PATENT DOCUMENTS

| | | | | |
|---|---|---|---|---|
| 5,822,741 A * | 10/1998 | Fischthal | ............... | G06K 9/62 706/16 |
| 6,826,724 B1 | 11/2004 | Shimada | | |
| 7,792,729 B2 * | 9/2010 | Caballero | ............... | G06Q 40/00 705/30 |
| 9,471,887 B2 | 10/2016 | Shin | | |
| 9,760,953 B1 * | 9/2017 | Wang | ................... | G06Q 40/123 |
| 9,779,317 B2 * | 10/2017 | Igarashi | ............. | H04N 1/00411 |
| 9,892,106 B1 * | 2/2018 | Lesner | .................. | G06F 17/243 |
| 9,916,628 B1 * | 3/2018 | Wang | ................... | G06Q 40/123 |
| 9,922,376 B1 * | 3/2018 | Wang | ................... | G06Q 40/123 |
| 9,959,560 B1 * | 5/2018 | Whitaker | ........... | G06Q 30/0625 |
| 9,990,678 B1 * | 6/2018 | Cabrera | ............... | G06Q 40/123 |
| 10,013,721 B1 * | 7/2018 | Laaser | ................. | G06Q 40/123 |
| 2002/0013747 A1 * | 1/2002 | Valentine | ............... | G06Q 20/10 705/31 |

(Continued)

OTHER PUBLICATIONS

U.S. Appl. No. 15/417,692, filed Jan. 27, 2017.

(Continued)

*Primary Examiner* — Daniel S Felten
(74) *Attorney, Agent, or Firm* — DLA Piper LLP (US)

(57) ABSTRACT

Disclosed are techniques for generating a personalized flow for a software delivery model. These techniques identify a plurality of business clusters and a plurality of expense categories for the plurality of business clusters and natural language description about a first characteristic of a specific user from an electronic tax return in an electronic tax return preparation and filing software application delivery model. One or more business clusters may be determined from the plurality of business clusters for the specific user based in part or in whole upon a user description vector of at least a part of the description. One or more expense categories may be identified for the electronic tax return of the specific user based in part or in whole upon the one or more business clusters.

24 Claims, 19 Drawing Sheets

(56) References Cited

U.S. PATENT DOCUMENTS

| | | | |
|---|---|---|---|
| 2004/0122755 A1* | 6/2004 | Bates | G06Q 40/00 |
| | | | 705/35 |
| 2007/0005509 A1* | 1/2007 | Spiller | G06Q 10/087 |
| | | | 705/65 |
| 2007/0271287 A1 | 11/2007 | Acharya | |
| 2009/0248678 A1 | 10/2009 | Okamoto | |
| 2010/0312726 A1 | 12/2010 | Thompson | |
| 2011/0125700 A1 | 5/2011 | Funada | |
| 2011/0231399 A1 | 9/2011 | Zhang | |
| 2011/0249905 A1* | 10/2011 | Singh | G06K 9/00449 |
| | | | 382/225 |
| 2014/0317019 A1 | 10/2014 | Papenbrock | |
| 2014/0337189 A1* | 11/2014 | Barsade | G06Q 40/123 |
| | | | 705/31 |
| 2015/0051948 A1 | 2/2015 | Aizono | |
| 2015/0120782 A1 | 4/2015 | Kim | |
| 2016/0042296 A1 | 2/2016 | Shan | |
| 2017/0068722 A1 | 3/2017 | Wang | |
| 2017/0147675 A1 | 5/2017 | Han | |
| 2017/0195731 A1 | 7/2017 | Girlando | |
| 2018/0052924 A1 | 2/2018 | Jagmohan | |
| 2018/0097815 A1 | 4/2018 | Wang | |
| 2018/0157800 A1 | 6/2018 | Ravishankar | |

OTHER PUBLICATIONS

U.S. Appl. No. 15/417,947, filed Jan. 27, 2017.
U.S. Appl. No. 15/417,758, filed Jan. 27, 2017.
U.S. Appl. No. 15/417,758, filed Jan. 27, 2017 (Nov. 1, 2019 to present).

* cited by examiner

SCHEDULE C
(Form 1040)

Department of the Treasury
Internal Revenue Service (99)

Profit or Loss From Business
(Sole Proprietorship)
▶ Information about Schedule C and its separate instructions is at www.irs.gov/schedulec.
▶ Attach to Form 1040, 1040NR, or 1041; partnerships generally must file Form 1065.

OMB No. 1545-0074

2016

Attachment Sequence No. 09

Name of proprietor | Social security number (SSN)

A  Principal business or profession, including product or service (see instructions)  602A    |  B  Enter code from instructions ▶

C  Business name. If no separate business name, leave blank.   |  D  Employer ID number (EIN), (see instr.)

E  Business address (including suite or room no.) ▶
   City, town or post office, state, and ZIP code
F  Accounting method:  (1) ☐ Cash   (2) ☐ Accrual   (3) ☐ Other (specify) ▶
G  Did you "materially participate" in the operation of this business during 2016? If "No," see instructions for limit on losses . ☐ Yes  ☐ No
H  If you started or acquired this business during 2016, check here . . . . . . . . . . . . . . . . . . . . . ▶ ☐
I  Did you make any payments in 2016 that would require you to file Form(s) 1099? (see instructions) . . . . . . . . ☐ Yes  ☐ No
J  If "Yes," did you or will you file required Forms 1099? . . . . . . . . . . . . . . . . . . . . . . . . . ☐ Yes  ☐ No

Part I  Income

1  Gross receipts or sales. See instructions for line 1 and check the box if this income was reported to you on Form W-2 and the "Statutory employee" box on that form was checked . . . . . . . . ▶ ☐ | 1
2  Returns and allowances . . . . . . . . . . . . . . . . . . . . . . . . . . . . . . . . | 2
3  Subtract line 2 from line 1 . . . . . . . . . . . . . . . . . . . . . . . . . . . . . . | 3
4  Cost of goods sold (from line 42) . . . . . . . . . . . . . . . . . . . . . . . . . . . | 4
5  Gross profit. Subtract line 4 from line 3 . . . . . . . . . . . . . . . . . . . . . . . | 5
6  Other income, including federal and state gasoline or fuel tax credit or refund (see instructions) . . . . | 6
7  Gross income. Add lines 5 and 6 . . . . . . . . . . . . . . . . . . . . . . . . . . . ▶ | 7

Part II  Expenses. Enter expenses for business use of your home only on line 30.

| 8  | Advertising | 8 | | 18 | Office expense (see instructions) | 18 |
| 9  | Car and truck expenses (see instructions) | 9 | | 19 | Pension and profit-sharing plans | 19 |
|    |             |   | | 20 | Rent or lease (see instructions): |    |
| 10 | Commissions and fees | 10 | | a | Vehicles, machinery, and equipment | 20a |
| 11 | Contract labor (see instructions) | 11 | | b | Other business property | 20b |
| 12 | Depletion | 12 | | 21 | Repairs and maintenance | 21 |
| 13 | Depreciation and section 179 expense deduction (not included in Part III) (see instructions) | 13 | | 22 | Supplies (not included in Part III) | 22 |
|    |   |   | | 23 | Taxes and licenses | 23 |
|    |   |   | | 24 | Travel, meals, and entertainment: |   |
| 14 | Employee benefit programs (other than on line 19) | 14 | | a | Travel | 24a |
|    |   |   | | b | Deductible meals and entertainment (see instructions) | 24b |
| 15 | Insurance (other than health) | 15 | | 25 | Utilities | 25 |
| 16 | Interest: |   | | 26 | Wages (less employment credits) | 26 |
| a  | Mortgage (paid to banks, etc.) | 16a | | 27a | Other expenses (from line 48) | 27a |
| b  | Other | 16b | | b | Reserved for future use | 27b |
| 17 | Legal and professional services | 17 | |   |   |   |

28  Total expenses before expenses for business use of home. Add lines 8 through 27a . . . . . . ▶ | 28
29  Tentative profit or (loss). Subtract line 28 from line 7 . . . . . . . . . . . . . . . . . . . | 29
30  Expenses for business use of your home. Do not report these expenses elsewhere. Attach Form 8829 unless using the simplified method (see instructions).
    Simplified method filers only: enter the total square footage of: (a) your home: _____
    and (b) the part of your home used for business: _____ . Use the Simplified Method Worksheet in the instructions to figure the amount to enter on line 30 . . . . . . . . . . | 30
31  Net profit or (loss). Subtract line 30 from line 29.
    • If a profit, enter on both Form 1040, line 12 (or Form 1040NR, line 13) and on Schedule SE, line 2.
      (If you checked the box on line 1, see instructions). Estates and trusts, enter on Form 1041, line 3. | 31
    • If a loss, you must go to line 32.
32  If you have a loss, check the box that describes your investment in this activity (see instructions).
    • If you checked 32a, enter the loss on both Form 1040, line 12, (or Form 1040NR, line 13) and
      on Schedule SE, line 2. (If you checked the box on line 1, see the line 31 instructions). Estates and   | 32a ☐ All investment is at risk.
      trusts, enter on Form 1041, line 3. | 32b ☐ Some investment is not at risk.
    • If you checked 32b, you must attach Form 6198. Your loss may be limited.

For Paperwork Reduction Act Notice, see the separate instructions.   Cat. No. 11334P   Schedule C (Form 1040) 2016

FIG. 6A

Schedule C (Form 1040) 2016 Page 2

Part III — Cost of Goods Sold (see instructions)

33 Method(s) used to value closing inventory: a ☐ Cost  b ☐ Lower of cost or market  c ☐ Other (attach explanation)

34 Was there any change in determining quantities, costs, or valuations between opening and closing inventory?
If "Yes," attach explanation . . . . . . . . . . . . . . . . . . . . . . . . . . . . . . ☐ Yes  ☐ No

| | | |
|---|---|---|
| 35 | Inventory at beginning of year. If different from last year's closing inventory, attach explanation . . . | 35 |
| 36 | Purchases less cost of items withdrawn for personal use . . . . . . . . . . . . | 36 |
| 37 | Cost of labor. Do not include any amounts paid to yourself . . . . . . . . . . . | 37 |
| 38 | Materials and supplies . . . . . . . . . . . . . . . . . . . . . . . | 38 |
| 39 | Other costs . . . . . . . . . . . . . . . . . . . . . . . . . . . | 39 |
| 40 | Add lines 35 through 39 . . . . . . . . . . . . . . . . . . . . . . | 40 |
| 41 | Inventory at end of year . . . . . . . . . . . . . . . . . . . . . . | 41 |
| 42 | Cost of goods sold. Subtract line 41 from line 40. Enter the result here and on line 4 . . . . . | 42 |

Part IV — Information on Your Vehicle. Complete this part only if you are claiming car or truck expenses on line 9 and are not required to file Form 4562 for this business. See the instructions for line 13 to find out if you must file Form 4562.

43 When did you place your vehicle in service for business purposes? (month, day, year)  ▶ ___ / ___ / ___

44 Of the total number of miles you drove your vehicle during 2016, enter the number of miles you used your vehicle for:

a Business _____  b Commuting (see instructions) _____  c Other _____

45 Was your vehicle available for personal use during off-duty hours? . . . . . . . . . . . . . . . ☐ Yes  ☐ No 46 Do you (or your spouse) have another vehicle available for personal use? . . . . . . . . . . . . ☐ Yes  ☐ No 47a Do you have evidence to support your deduction? . . . . . . . . . . . . . . . . . . . . ☐ Yes  ☐ No b If "Yes," is the evidence written? . . . . . . . . . . . . . . . . . . . . . . . . . . . ☐ Yes  ☐ No

Part V — Other Expenses. List below business expenses not included on lines 8–26 or line 30.

| 602B | 604B |
|---|---|
| | |

48 Total other expenses. Enter here and on line 27a . . . . . . . . . . . . . . . . . 48

Schedule C (Form 1040) 2016

| Form 990 | Return of Organization Exempt From Income Tax | OMB No. 1545-0047 |
|---|---|---|
| | Under section 501(c), 527, or 4947(a)(1) of the Internal Revenue Code (except private foundations) | 2016 |
| Department of the Treasury<br>Internal Revenue Service | ▶ Do not enter social security numbers on this form as it may be made public.<br>▶ Information about Form 990 and its instructions is at www.irs.gov/form990. | Open to Public<br>Inspection |

A For the 2016 calendar year, or tax year beginning _____, 2016, and ending _____, 20___

| B Check if applicable: | C Name of organization | D Employer identification number |
|---|---|---|
| ☐ Address change | Doing business as | |
| ☐ Name change | Number and street (or P.O. box if mail is not delivered to street address) Room/suite | E Telephone number |
| ☐ Initial return | | |
| ☐ Final return/terminated | City or town, state or province, country, and ZIP or foreign postal code | |
| ☐ Amended return | | G Gross receipts $ |
| ☐ Application pending | F Name and address of principal officer: | H(a) Is this a group return for subordinates? ☐ Yes ☐ No |
| | | H(b) Are all subordinates included? ☐ Yes ☐ No |
| I Tax-exempt status: ☐ 501(c)(3)  ☐ 501(c) (  ) ◀ (insert no.) ☐ 4947(a)(1) or ☐ 527 | | If "No," attach a list. (see instructions) |
| J Website: ▶ | | H(c) Group exemption number ▶ |
| K Form of organization: ☐ Corporation ☐ Trust ☐ Association ☐ Other ▶ | L Year of formation: | M State of legal domicile: |

Part I  Summary

1. Briefly describe the organization's mission or most significant activities:
   _____ 602F _____

2. Check this box ▶ ☐ if the organization discontinued its operations or disposed of more than 25% of its net assets.
3. Number of voting members of the governing body (Part VI, line 1a) . . . . . . . . . | 3 |
4. Number of independent voting members of the governing body (Part VI, line 1b) . . . . | 4 |
5. Total number of individuals employed in calendar year 2016 (Part V, line 2a) . . . . . | 5 |
6. Total number of volunteers (estimate if necessary) . . . . . . . . . . . . . . . | 6 |
7a. Total unrelated business revenue from Part VIII, column (C), line 12 . . . . . . . | 7a |
   b. Net unrelated business taxable income from Form 990-T, line 34 . . . . . . . . . | 7b |

| | Prior Year | Current Year |
|---|---|---|
| 8  Contributions and grants (Part VIII, line 1h) . . . . . . . . . . . . . . | | |
| 9  Program service revenue (Part VIII, line 2g) . . . . . . . . . . . . . . | | |
| 10 Investment income (Part VIII, column (A), lines 3, 4, and 7d) . . . . . . | | |
| 11 Other revenue (Part VIII, column (A), lines 5, 6d, 8c, 9c, 10c, and 11e) . | | |
| 12 Total revenue—add lines 8 through 11 (must equal Part VIII, column (A), line 12) | | |
| 13 Grants and similar amounts paid (Part IX, column (A), lines 1–3) . . . . | | |
| 14 Benefits paid to or for members (Part IX, column (A), line 4) . . . . . . | | |
| 15 Salaries, other compensation, employee benefits (Part IX, column (A), lines 5–10) | | |
| 16a Professional fundraising fees (Part IX, column (A), line 11e) . . . . . . | | |
|   b Total fundraising expenses (Part IX, column (D), line 25) ▶ _____ | | |
| 17 Other expenses (Part IX, column (A), lines 11a–11d, 11f–24e) . . . . . . | | |
| 18 Total expenses. Add lines 13–17 (must equal Part IX, column (A), line 25) . | | |
| 19 Revenue less expenses. Subtract line 18 from line 12 . . . . . . . . . | | |

| | Beginning of Current Year | End of Year |
|---|---|---|
| 20 Total assets (Part X, line 16) . . . . . . . . . . . . . . . . . . . . | | |
| 21 Total liabilities (Part X, line 26) . . . . . . . . . . . . . . . . . . . | | |
| 22 Net assets or fund balances. Subtract line 21 from line 20 . . . . . . . | | |

Part II  Signature Block

Under penalties of perjury, I declare that I have examined this return, including accompanying schedules and statements, and to the best of my knowledge and belief, it is true, correct, and complete. Declaration of preparer (other than officer) is based on all information of which preparer has any knowledge.

| Sign Here | ▶ Signature of officer | Date |
|---|---|---|
| | ▶ Type or print name and title | |

| Paid Preparer Use Only | Print/Type preparer's name | Preparer's signature | Date | Check ☐ if self-employed | PTIN |
|---|---|---|---|---|---|
| | Firm's name ▶ | | | Firm's EIN ▶ | |
| | Firm's address ▶ | | | Phone no. | |

May the IRS discuss this return with the preparer shown above? (see instructions) . . . . . . . . . . . . ☐ Yes ☐ No For Paperwork Reduction Act Notice, see the separate instructions.        Cat. No. 11282Y        Form 990 (2016)

FIG. 6F

Form 990 (2016) Page 2

Part III Statement of Program Service Accomplishments
Check if Schedule O contains a response or note to any line in this Part III . . . . . . . . . . . . . . . . ☐

1  Briefly describe the organization's mission:

602G

2  Did the organization undertake any significant program services during the year which were not listed on the prior Form 990 or 990-EZ? . . . . . . . . . . . . . . . . . . . . . . . . . . . . . . . . . . . . . . ☐ Yes  ☐ No
If "Yes," describe these new services on Schedule O.

3  Did the organization cease conducting, or make significant changes in how it conducts, any program services? . . . . . . . . . . . . . . . . . . . . . . . . . . . . . . . . . . . . . . . . . . . . . . ☐ Yes  ☐ No
If "Yes," describe these changes on Schedule O.

4  Describe the organization's program service accomplishments for each of its three largest program services, as measured by expenses. Section 501(c)(3) and 501(c)(4) organizations are required to report the amount of grants and allocations to others, the total expenses, and revenue, if any, for each program service reported.

4a  (Code: _____ ) (Expenses $ _____ including grants of $ _____ ) (Revenue $ _____ )

4b  (Code: _____ ) (Expenses $ _____ including grants of $ _____ ) (Revenue $ _____ )

604G 4c  (Code: _____ ) (Expenses $ _____ including grants of $ _____ ) (Revenue $ _____ )

4d  Other program services (Describe in Schedule O.)
(Expenses $ _____ including grants of $ _____ ) (Revenue $ _____ )
4e  Total program service expenses ▶

Form 990 (2016)

FIG. 6G

Form 990 (2016) Page 8

Part VII Section A. Officers, Directors, Trustees, Key Employees, and Highest Compensated Employees *(continued)*

| (A) Name and title | (B) Average hours per week (list any hours for related organizations below dotted line) | (C) Position (do not check more than one box, unless person is both an officer and a director/trustee) | | | | | | (D) Reportable compensation from the organization (W-2/1099-MISC) | (E) Reportable compensation from related organizations (W-2/1099-MISC) | (F) Estimated amount of other compensation from the organization and related organizations |
|---|---|---|---|---|---|---|---|---|---|---|
| | | Individual trustee or director | Institutional trustee | Officer | Key employee | Highest compensated employee | Former | | | |
| (15) | | | | | | | | | | |
| (16) | | | | | | | | | | |
| (17) | | | | | | | | | | |
| (18) | | | | | | | | | | |
| (19) | | | | | | | | | | |
| (20) | | | | | | | | | | |
| (21) | | | | | | | | | | |
| (22) | | | | | | | | | | |
| (23) | | | | | | | | | | |
| (24) | | | | | | | | | | |
| (25) | | | | | | | | | | |

1b Sub-total . . . . . . . . . . . . . . . . . . . ▶
c Total from continuation sheets to Part VII, Section A . . . . . ▶
d Total (add lines 1b and 1c) . . . . . . . . . . . . . . . . . ▶
2 Total number of individuals (including but not limited to those listed above) who received more than $100,000 of reportable compensation from the organization ▶

| | | Yes | No |
|---|---|---|---|
| 3 | Did the organization list any former officer, director, or trustee, key employee, or highest compensated employee on line 1a? *If "Yes," complete Schedule J for such individual* . . . . . . . . . . . . . . | | |
| 4 | For any individual listed on line 1a, is the sum of reportable compensation and other compensation from the organization and related organizations greater than $150,000? *If "Yes," complete Schedule J for such individual* . . . . . . . . . . . . . . . . . . . . . . . . . . . . . . . . . . . . . . . . . . | | |
| 5 | Did any person listed on line 1a receive or accrue compensation from any unrelated organization or individual for services rendered to the organization? *If "Yes," complete Schedule J for such person* . . . . . . | | |

Section B. Independent Contractors

1 Complete this table for your five highest compensated independent contractors that received more than $100,000 of compensation from the organization. Report compensation for the calendar year ending with or within the organization's tax year.

| (A) Name and business address | (B) Description of services | (C) Compensation |
|---|---|---|
| | | |
| | 602H | |
| | | |

2 Total number of independent contractors (including but not limited to those listed above) who received more than $100,000 of compensation from the organization ▶

Form 990 (2016)

FIG. 6H

```
○ ○ ○                    ⬜ expenses_musician.tsv - Edited ▼

RAW_OTHER_BUSINESS_EXPENSES
٭SECTION 465(d) CARRYOVER:18559
 ٭Song Downloads For Requests:7;Pedal Board:109;Power Supply:41;Dual Guitar Stand:111;Amp Stand:
 38;Amp Repair:10;Batteries:12
 ٭postage/shipping:56
 ٭concert clothing:1000
 ٭USPS:5;Instruments, Gear, Cables, Strings, etc.:0;HMMA Trip Expense:0;CMA Awards:0;Adobe
 Subscription:0;Ipad (payment plan):0;Iphone 5s (payment plan):0;Iphone 6 (payment plan):0;Recording
 Studio (/4):905
 ٭Clothing:250
 ٭Sticks/Heads / Other:225;Education drum clinic:100;Private lesson:50;subscription drumchannel:50
 ٭Instrument repairs:3294;Instruments:8806
 ٭music subscription:0;piano tuning:0;accompaniast:0;sheet music:0
 ٭Music equipment:0;insurance:0;attire:0
 ٭Drum Sticks:648;Stage Clothing:250;Drum Heads:225;Cymbals:510;Microphones:0;Cymbal Stands:57;Drum
 Cases:0;Tax Preparation Software:149;Chase Bank Service Charges:144;Peavey Headphone Amp:119
 ٭Poster Printing:0
 ٭Music equipment:2450;SECTION 465(d) CARRYOVER:2987;Instrument and music supplies:1172;research and
 development:59;reeds:164;computer repair:297
 ٭Music:108;Baton Repair:19;Warburton 3MD mouthpiece top:85
 ٭Misc:47;Uniform:1296
 ٭Violin bow:1300
 ٭Shure Bete 58:168;Stienhauser Microphone:106;Guitar pedals:260;picks:54;Guitar cables:
 138;Microphone cables and stands:148;Guitar Strings:265;Martin Acoustic Guitar:684;Music Man
 electric Guitar:780;CD's:100
 ٭Roland KC-550 Amplifier:585;Music Stand:50;Mighty Bright Stand Lights (2):64;Music Stand
 Extenders:10
 ٭Phil M - Lessons:200;MacPhail Jazz Ensemble:305;Equipment:514;Equipment:108
 ٭Guitar strings and upkeep, piano tuning, etc:250;Online music services:50;CD shipping & Postage:50
 ٭Shipping:212;Rights and royalties:683;printing:1241
 ٭music books:200
```

FIG. 6I

| | 602J | 604J | 606J | 608J |
|---|---|---|---|---|
| | Summary | Cluster ID(s) | Examplar(s) | Examples |
| | Professional and Business Development Classes | 31, 100 | Classes / education workshops and online business courses | Classes, professional development classes |
| | Yoga attire and apparel: yoga pants, uniforms | 4, 36, 3, 44, 106, 13, 48 | Yoga clothes / yoga apparel / professional clothing / clothing / uniforms / performance wears / show clothes | Yoga clothes, yoga pants, yoga uniforms, yoga music, . . . |
| | Printing Costs: advertisements and flyers | 28 | Printing costs | Startup costs, printing costs, . . . |
| | Professional memberships: Yoga Alliance, YogaGIO . . . | 8, 69 | Yoga alliance membership / Galam monthly membership / fees | Yoga alliance dues (professional organization), . . . |
| | Bank and credit card processing fees | 35, 38 | Bank fees / credit card processing fees | Bank fees, interests, bank transaction fees, . . . |
| | Yoga certification fees and training expenses | 49, 29 | Yoga certification / certification training | Yoga certification, Barre certification, certification training, . . . |

FIG. 6J

METHODS, SYSTEMS, AND COMPUTER PROGRAM PRODUCT FOR PROVIDING EXPENSE INFORMATION FOR AN ELECTRONIC TAX RETURN PREPARATION AND FILING SOFTWARE DELIVERY MODEL

CROSS-REFERENCE TO RELATED APPLICATIONS

The present application is related to U.S. patent application Ser. No. 15/417,758 filed Jan. 27, 2017, entitled "METHODS, SYSTEMS, AND COMPUTER PROGRAM PRODUCT FOR GENERATING A PERSONALIZED FLOW FOR A SOFTWARE DELIVERY MODEL", U.S. patent application Ser. No. 15/417,692 filed Jan. 27, 2017, entitled "METHODS, SYSTEMS, AND COMPUTER PROGRAM PRODUCT FOR IMPLEMENTING CLUSTER-BASED PROCESSING OF DIGITAL FORMS WITH WORD EMBEDDING TECHNIQUES", and U.S. patent application Ser. No. 15/417,947 filed Jan. 27, 2017, entitled "METHODS, SYSTEMS, AND COMPUTER PROGRAM PRODUCT FOR PERFORMING ANALYTICS AND ANONYMIZATION OF DATA RECORDS OF FINANCIAL MANAGEMENT SOFTWARE PROGRAMS". The contents of the aforementioned patent applications are hereby expressly incorporated by references in their entireties for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Users unfamiliar with the IRS tax code or what itemized deductions may be claimed often tend to lose the tax advantages of legitimate deductions. Conventional electronic tax return preparation software applications cluster a business with the NAICS (North American Industry Classification System) codes or even the older SIC (Standard Industrial Classification) codes and often fail to provide relevant or correct recommendations for itemized deductions to users. Such codes often categorize some businesses that are tangentially related at best. As a result, any cluster results based on such codes are marginally useful at best.

Some conventional approaches rely on user provided transaction information to categorize user's transactions into expense categories that may not be reported in the tax return if the user lacks such knowledge. Moreover, even experienced users may not be familiar with the chances of IRS audit associated with certain user entries. In addition, the amounts of deductions are generally entered manually and are thus susceptible to human errors. Conventional approaches often checks for anomalies or errors based solely upon the numeric amounts entered by a user in comparison with some average of similar users but fail to consider any user specific information in such checks.

Therefore, there exists a need for a method, system, and computer program product for providing tax return information for an electronic tax return preparation and filing software application delivery model to address at least the aforementioned shortcomings of conventional approaches.

SUMMARY

Disclosed are method(s), system(s), and article(s) of manufacture for providing tax return information for an electronic tax return preparation and filing software application delivery model in various embodiments.

Some embodiments are directed to a method for providing tax return information for an electronic tax return preparation and filing software application delivery model. In these embodiments, a plurality of business clusters and a plurality of expense categories may be identified for the plurality of business clusters and natural language description about a first characteristic of a specific user from an electronic tax return in an electronic tax return preparation and filing software application delivery model. One or more business clusters may be determined from the plurality of business clusters for the specific user based in part or in whole upon a user description vector of at least a part of the description. One or more expense categories may be identified for the electronic tax return of the specific user based in part or in whole upon the one or more business clusters.

In some embodiments, a plurality of descriptions about a plurality of users accessing one or more versions of the electronic tax return preparation and filing software application delivery model may be identified into a corpus; and pertinent natural language information may be identified from respective electronic tax returns of the plurality of users. In some of these embodiments, the corpus and/or the pertinent natural language information may be normalized into normalized corpus comprising a plurality of unique tokens; and the normalized corpus may be transformed into a plurality of vector representations in a vector space for the plurality of users.

In addition, a plurality of business clusters may be determined for the plurality of user by using at least the plurality of vector representations; and a plurality of expense categories may be determined for the plurality of business clusters by using at least the plurality of business clusters in some embodiments. Moreover, the description about the specific user from the electronic tax return of the specific user may be identified; and additional natural language information about the specific user may be identified from a software application flow of the electronic tax return preparation and filing software application delivery model.

In some of these embodiments, the description and/or the additional natural language information may be normalized into normalized information comprising one or more unique tokens; and the normalized information may be transformed into a specific vector representation in the vector space for the specific user. Furthermore, a set of business clusters may be determined for the specific user by using at least the specific vector representation; the set of business clusters may be ranked into a set of ranked business clusters based in part or in whole upon one or more first criteria; and the one or more business clusters may be selected for the specific user from the set of business clusters or the set of ranked business clusters in some of the immediately preceding embodiments.

In some embodiments, one or more expense categories may be identified for the specific user based in part or in whole upon the set of business clusters or the set of ranked business clusters; the one or more expense categories may be ranked into one or more ranked expense categories based in part or in whole upon one or more second criteria; and at least one expense category of the one or more expense categories or the one or more ranked expense categories may be presented in the software application flow for the specific user.

To provide tax return information, one or more first expense clusters from the electronic tax return of the specific user and one or more first business clusters into which the specific user is classified; additional natural language information about the specific user may be identified; and current or historical data may be identified from the specific user or a plurality of users in the one or more first business clusters with the specific user. In some embodiments, additional pertinent data pertaining to the one or more first expense categories may be determined at least by embedding the additional natural language information and/or the current or historical data into one or more additional vector representations in the vector space; and a first anomaly check may be performed on the one or more first expense clusters and/or the one or more first business clusters using at least the one or more additional vector representations.

In some of these embodiments, a determination may be made to decide whether at least one first cluster is to be removed based in part or in whole the additional pertinent data that comprises one or more similarity metrics between the one or more additional vector representations and the one or more first expense clusters and/or the one or more first business clusters; and whether removal of the at least one first cluster is to be performed may be validated for the specific user when validation of removal of clusters is determined to be performed.

In addition, the at least one first cluster may be presented in a first personalized interview or chat window to the specific user in the electronic tax return preparation and filing software application delivery model when the at least one cluster is determined to be removed; and the at least one first cluster may be from the electronic tax return when the at least one first cluster is determined to be removed.

In some embodiments, a determination may be made to decide whether at least one second cluster is to be added for the specific user based in part or in whole the additional pertinent data that comprises the one or more similarity metrics between the one or more additional vector representations and the description about the first characteristic of the specific user; and whether addition of the at least one second cluster is to be performed may be validated for the specific user when validation of addition of clusters is determined to be performed. The at least one second cluster may be presented in a second personalized interview or chat window to the specific user in the electronic tax return preparation and filing software application delivery model when the at least one cluster is determined to be validated or modified; and the at least one first cluster may be added when the at least one first cluster is determined to be added.

Some embodiments are directed at one or more hardware modules that include and/or function in conjunction with at least one micro-processor as well as other related components or architectures of one or more computing systems and may be invoked to perform any of the methods, processes, or sub-processes disclosed herein. The hardware system may include, for example, a normalization module, one or more word embedding modules, one or more multi-stage clustering modules, a profiler module, an analytics module, an anonymization module, one or more machine learning or artificial intelligence (A.I.) modules, and/or an anomaly check module as described in more details below in some embodiments.

Each of these modules may include or function in tandem with electrical circuitry and one or more micro-processors each having one or more processor cores to perform its intended functions. The hardware system may further include one or more forms of non-transitory machine-readable storage media or persistent storage devices to temporarily or persistently store various types of data or information, various design rules, various libraries, selected and selectable targets, or any other suitable information or data, etc. A module may be initialized in a computing system so that the software portion of the module is stored in memory (e.g., random access memory) to be executed by one or more processors or processor cores off the computing system to perform at least a part of the functionality of the module. Some illustrative modules or components of the hardware system may be found in the description below with reference to FIGS. 7A-7C.

Some embodiments are directed at an article of manufacture that includes a non-transitory machine-accessible storage medium having stored thereupon a sequence of instructions which, when executed by at least one micro-processor or at least one processor core, causes the at least one micro-processor or the at least one processor core to perform any of the methods, processes, or sub-processes disclosed herein. Some illustrative forms of the non-transitory machine-readable storage media may also be found in the System Architecture Overview section below.

More details of various aspects of the methods, systems, or articles of manufacture for providing tax return information for an electronic tax return preparation and filing software application delivery model are described below with reference to FIGS. 1-7C.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIGS. 6A-6K illustrate some examples that are referenced or produced by various modules described herein in some embodiments.

DETAILED DESCRIPTION

Figure 1:
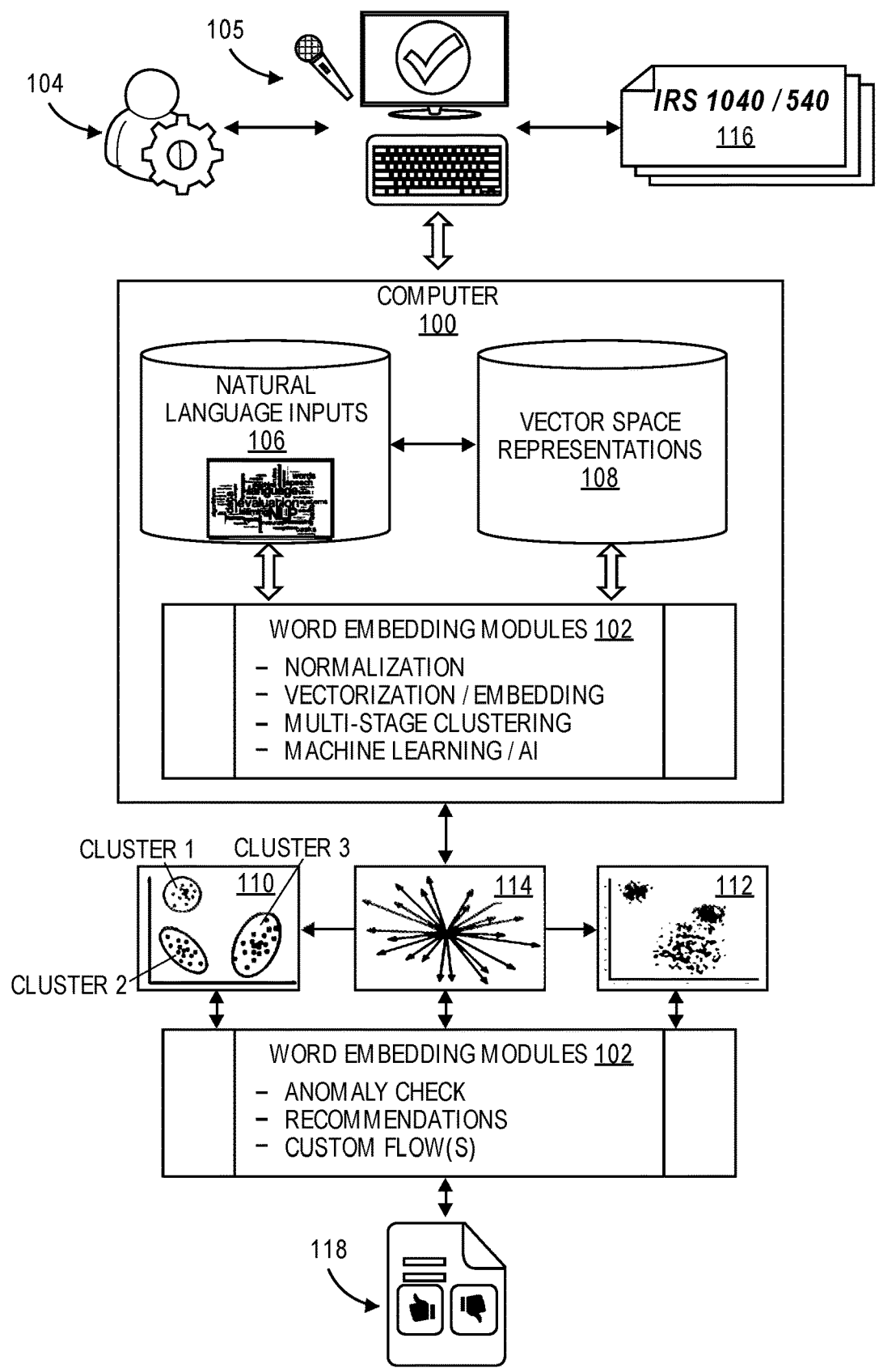
FIG. 1 illustrates a high level block diagram for providing tax return information for an electronic tax return preparation and filing software application delivery model in one or more embodiments.

Various embodiments are directed to a method, system, and computer program product for generating a personalized flow for a software delivery model. Other objects, features, and advantages of the invention are described in the detailed description, figures, and claims.

In these embodiments, user information (e.g., description of users' business or profession) and characteristics (e.g., description of users' expenses claimed in tax returns) of a plurality of users may be embedded into a vector space for a software application delivery model (e.g., an electronic tax return preparation and filing software delivery model). The plurality of users may be classified into a plurality of user clusters (e.g., business clusters or profession clusters) with word embedding techniques. Each user cluster thus includes a group of similar users according to their respective user information. For each user cluster, users' characteristics (e.g., description of expenses) may also be classified into a plurality of characteristic clusters (e.g., expense categories, etc.) using the word embedding techniques. Each characteristic cluster thus represents similar characteristics.

When a specific user accesses the software application delivery model, the specific user may provide specific user information into the software application delivery model. This specific user information may also be embedded into the same vector space. With this embedded specific user information, the specific user may be determined to belong to one or more specific user clusters. One or more characteristic clusters that are more common to these one or more specific user clusters may be identified for the specific user. These one or more characteristic clusters may be treated as personalized information clusters for the specific user because these one or more characteristic clusters have been determined to be similar to each other for a group of users to which the specific user also belongs.

Strictly as an example, a user may access an electronic tax return preparation and filing software delivery model and provides some description of his business. This business description may be transformed into a business description vector the vector space that also corresponds to a plurality of other business description of a plurality of users. The business description vector of the specific user may then be clustered into one or more business clusters, each corresponding to a respective set of expense categories. Once the business clusters are determined for the specific user, one or more expense categories associated with these business clusters, into which the specific user is clustered, may be identified as one or more personalized expense categories for the specific's user's tax return. For example, the expense category that most number of user in the user cluster claim may be identified as the personalized expense category for the specific user. As another example, the expense category that corresponds to the highest average expense amount for a user cluster may be identified as the personalized expense category for the specific user.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

FIG. 1 illustrates a high level block diagram for providing tax return information for an electronic tax return preparation and filing software application delivery model in one or more embodiments. In these embodiments, a user 104 accessing an electronic tax return preparation and filing software application delivery model may provide various pieces of information 116 in the form of natural language via an input device (e.g., a keyboard, a microphone, etc.) of a computing device 105.

The electronic tax return preparation and filing software application delivery model may be a standalone installation that locally executes on the computer 106 in some embodiments. In some other embodiments, the electronic tax return preparation and filing software application delivery model may be hosted on a remote computer (e.g., 760B of FIG. 7B), on an Internet-based computing environment providing shared computer processing resources and data to computers and other devices on demand (e.g., in a cloud computing environment), or provided as a software licensing and delivery model in which software is licensed on a subscription basis and is centrally hosted (e.g., software as a service or SaaS). In these latter embodiments, the user 104 may access the electronic tax return preparation and filing software application delivery model via, for example, a browser on a user computing device operatively connected to the remote host via a computer network component.

The user 104 may be operating on or connected to a computing system 100 that includes or operatively connects to one or more word embedding modules 102. This computing system may be the computing device 105 when the electronic tax return preparation and filing software application delivery model is a standalone installation. The word embedding modules 102 included or associated with the computer 100 may perform various word embedding processes on natural language inputs 106 of a software application delivery model. These natural language inputs 106 may be provided by a plurality of users accessing the software application delivery model. For example, the natural language inputs 106 may include the descriptions of businesses or professions in Schedule C of Form 1040 when using an electronic tax return preparation and filing software application.

These word embedding processes may include, for example, normalization of the natural language inputs into normalized tokens such as characters, words, phrase, sentences, or even documents. These normalized tokens may be further embedded into a vector space. More specifically, one or more word embedding processes may transform these normalized tokens into corresponding vector representations 108 where closer vector representations correspond to more similar normalized tokens and hence more similar natural language inputs (106).

These word embedding modules 102 may further cluster the natural language inputs 106 into a plurality of clusters. Strictly as an example, descriptions of businesses or professions in Schedule C of Form 1040 may be clustered into a plurality of business clusters where each cluster corresponds to similar businesses as indicated by their respective descriptions. As another example, users' inputs in "Other Expenses" in Part V of Schedule C of Form 1040 may also be similarly be normalized, vectorized, and clustered into a plurality of expense categories.

These clustering processes may be performed independently of each other or in a hierarchical manner. In the aforementioned examples, the business clusters and expense categories may be performed independently of one another to determine the clusters for a plurality of users in some embodiments. In some other embodiments, such clustering may be performed in a hierarchical, multi-stage manner where a plurality of descriptions of businesses or professions may be first clustered into a plurality of business clusters.

With a particular business cluster corresponding to a set of users, the users' input in the "Other Expenses" section may be further clustered into one or more expense categories that represent the categories claimed by the set of users. The normalization, vectorization, and clustering processes may be performed offline in some embodiments due to the vast amount of natural language inputs (106) to process and thus may not be suitable for storage or processing on a user computing device. The results of the normalization, vectorization, and clustering processes may nevertheless be stored locally on a user's computing device for a locally executing electronic tax return preparation and filing software application delivery model in some embodiments. In some other embodiments, the results of the normalization, vectorization, and clustering may be stored remotely for user computing devices to access via one or more computer networks.

With these vector representations, business clusters, and expense categories determined, these processing results of the one or more word embedding modules 102 may be further utilized by a software application delivery model. In the aforementioned example involving tax returns, a specific user 104 may access an electronic tax return preparation and filing software application delivery model and provide a specific description 116 about, for example, the user's business or profession in Schedule C via an input device (e.g., a computer mouse, a touch interface, a virtual or physical keyboard, a microphone, etc.) of the computing device 105.

This specific description 116 may be similarly processed by one or more word embedding modules 102 that execute locally in a standalone installation or remotely in a hosted environment. For example, this specific description 116 may be normalized into normalized description which may be further transformed into a specific vector representation in the same vector space 114 that now includes the specific vector representation with other vector representations for the descriptions from a plurality of users of the electronic tax return preparation and filing software application delivery model.

This specific description 116 of the specific user 104 may then be clustered into one or more business or user clusters 110. One or more expense clusters 112 corresponding to these one or more business or user clusters 110 may be identified. These one or more expense clusters 112 may include, for example, the expense clusters that most percentage or number of users in the business cluster claim, the expense clusters that correspond to highest amounts (e.g., an average amount among users claiming expenses in these clusters, etc.), or any other suitable expense clusters.

At least one of these expense clusters may be presented to the user in a variety of different manners while including information sufficiently specific to the expense cluster so as to minimize or reduce the amount of data input by the specific user. For example, a expense cluster may be presented to a user in an interview screen, a chat session, a popup window, etc. asking the specific user 104 for the minimal amount or a reduced amount of information for completing the tax return form.

A customized or personalized software application flow may also be constructed with one or more of these expense clusters for the specific user 104. Because these expense clusters are identified from one or more user clusters to which the specific user is determined to belong based on the specific business description provided by the specific user, these expense clusters may thus represent recommended expenses or candidate expenses that the specific user is more likely to claim. The information (e.g., descriptions, amounts, and/or clusters of the expenses claimed by specific user, etc.) in the electronic tax return form 118 may be checked by an anomaly check module in some embodiments.

If the specific user 104 also provides additional natural language inputs (e.g., descriptions of expenses in "Other Expenses" in Schedule C) in the specific description 116, these additional natural language inputs may also be similarly normalized, vectorized, and clustered. The clustering results of these additional natural language inputs may be used in place of or in addition to the one or more expense clusters determined from the specific description 116 as described above.

Figure 2:
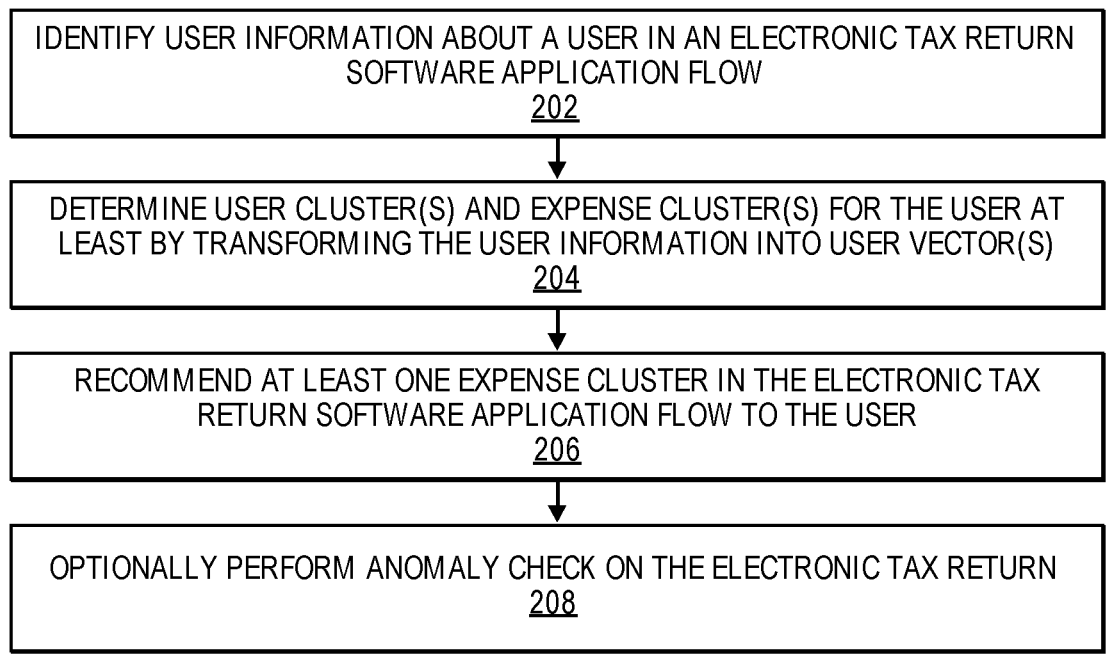
FIG. 2 illustrates a high level flow diagram for providing tax return information for an electronic tax return preparation and filing software application delivery model in one or more embodiments.

FIG. 2 illustrates a high level flow diagram for providing tax return information for an electronic tax return preparation and filing software application delivery model in one or more embodiments. In these embodiments, user information about a specific user may be identified at 202 in a software flow of an electronic tax return software application. The user information may include information expressed in natural language and may be provided by the user in the software flow of the electronic tax return software application.

One or more user clusters into which the specific user may be classified as well as one or more expense clusters for the one or more user clusters may be determined at 204 for the specific user at 204. A user cluster is determined by processing the respective user descriptions with word embedding techniques and thus corresponds to a set of similar users based at least in part upon the respective user descriptions about this set of users. Similarly, an expense cluster may be determined by processing various descriptions of expenses (e.g., business expenses in Part V "Other Expenses" of Schedule C, Form 1040, etc.) for a group of users in a user cluster with word embedding techniques and thus corresponds to similar expense categories for this group of users.

More details about determining user clusters and expense clusters are described below with reference to FIG. 3.

At least one expense cluster of the one or more expense clusters determined at 204 or a personalized software application flow may be recommended or provided at 206 to the specific user in the electronic tax return software application as a personalized expense category. This at least one expense cluster may be considered as a personalized expense category for the specific user because this at least one expense cluster is determined for a user cluster of similar users that includes the specific user, and further because the specific user is classified into the user cluster based on the user information identified at 202 about this specific user.

A user cluster may correspond to a plurality of expense categories that may be further ranked according to one or more criteria. For example, expense categories may be ranked based on the percentage or number of similar users (e.g., users in a user cluster) who previously (e.g., in one or more prior tax years) or currently (e.g., in the current tax year) claim these expense categories. As another example, expense categories may be ranked based on respective amounts (e.g., average or median amounts, or any other suitable measures) that similar users in a user cluster previously or currently claim in their respective tax returns. Other criteria may also be used to rank the expense categories to reflect the corresponding significance of these expense categories for the users. For example, expense categories may be ranked based on a weighted combination of a plurality of criteria (e.g., percentage or number of claiming users, amounts of deductions, etc.)

The recommended expense categories described so far may be selected from a plurality of expense clusters for a user cluster in some embodiments. In other embodiments, a recommended expense category may be generated based on another expense category that is provided by a user or recommended by these techniques described herein. For example, these techniques may recognize that a user entered, either sua sponte or via a recommendation by these techniques described herein, an expense item for the purchase of a camera for the user's business.

These techniques may further inquire (e.g., by a custom, personalized flow or in a pop-up window, etc.) into whether other expenses related to the camera expense item may be presented. These other related expenses (e.g., lenses, accessories, service charges, etc.) may be identified from the clustering results in some embodiments. For example, these techniques may identify such related expenses from one or more user clusters a percentage of which claims similar or identical expenses and from the respective one or more expense clusters of these one or more user clusters. In other embodiments, these other expenses may be identified by determining the similarity scores of these other expenses with respect to the expense cluster or the expense description of the camera.

Yet in some other embodiments, such other expenses may be identified from one or more predetermined data structures listing one or more expense items or clusters (e.g., camera accessories) that are often induced by the presence of another expense item or cluster (e.g., camera expense item). In some other embodiments, the techniques described herein may accommodate additional information to determine a personalized expense category for recommendation.

For example, the user information identified at 202 may include specific information about the specific user, and this specific information may provide especially distinguishing information about this specific user. This especially distinguishing information may be used in determining the recommended expense categories even though the recommended expense categories are not among the highest ranked expense clusters for the user cluster into which the specific user is classified.

As another example, the specific user may be classified into a user cluster by using one piece of user information while the user information identified at 202 may include other information about the user that has not been used in determining the user clusters. For example, a word embedding module may classify users into a plurality of user categories by applying word embedding techniques to the description in Field A "Principal business or profession, including product or service" of Schedule C, Form 1040 but not the information in "Other Expenses" in Part V of Schedule C. In this example, the additional information (also in natural language) about the specific user may be further used to adjust the user clusters and/or the expense clusters determined at 204 or to determine one or more specific expense clusters in addition to or in the alternative of the expense clusters determined by using the information from the principal business or profession section. In this manner, the electronic tax return preparation and filing software application delivery model is made aware of and better understands the specific nature of the specific user.

One of the objectives of the word embedding techniques is to conserve computational resources in determining various clusters and the recommended expense clusters or personalized software application flow for the same software delivery model. For example, in determining user clusters and expense clusters, these techniques extensively trim down the size of corpora for the user information and optimize the word embedding modules in at least their iterative training and updating various entries in one or more data structures to save computational resource requirement of memory footprint as well as processor cycles.

In some embodiments, a personalized software application flow including one or more personalized flow node may be constructed based on one or more expense categories determined at 204 or recommended at 206. More specifically, depending on how the specific user is classified and/or the one or more expense clusters determined for the user clusters into which the specific user is classified, one or more content propagation flow nodes, one or more decision nodes, etc. may be constructed. For example, the expense category of "entertainment expenses" may be determined for or recommended to a specific user after clustering the user information about the specific user.

A decision node may be constructed to apply one or more tests that determine the eligibility of claiming entertainment expenses for this specific user. For example, an interview screen or a chat screen may be constructed to inquire into whether entertainment occurred in a clear business setting, whether the main purpose of entertainment was conducting business, whether the specific user had more than general expectation of obtaining new or additional businesses or business benefit, whether entertainment was associated with the trade or business of the specific user, whether the entertainment directly preceded or followed a substantial business discussion, whether the entertainment expense has been reimbursed, whether the expense exceeded the reimbursement, whether the specific user accounted to the employer under an accountable plan, etc.

If the specific provides the response in the decision node, a content propagation may be further generated and presented to the specific user. For example, a content propagation flow node may be further presented to the user as a follow-up interview or chat screen to inquire into specific information about the entertainment expense (e.g., the amount spent), specific description of properties for depreciation and amortization or charitable contributions, etc.

In some embodiments, a personalized action node may be generated to either ask a user to take one or more actions or to perform one or more actions on behalf of the user automatically. In addition or in the alternative, a personalized flow may be personalized for a specific user in some embodiments or personalized for a specific business entity or even a specific industry to which a specific user is determined to belong. For example, these techniques may determine that a user is clustered as an online transportation network driver (e.g., a Uber driver) based on processing the user's description of business or profession in the user's Schedule C. If this online transportation network has partnered with the provider of the electronic tax return and filing software application so that wage data may be electronically imported from the online transportation network to the developer, a personalized action node may be generated without user intervention to either ask the user to provide the login credentials, consent, etc. for the online transportation network so that the action node may create a session (e.g., a secure connection) to connect to the online transportation network and to import the wage data.

In some embodiments, various techniques described herein are configured to reduce or minimize the amount of information a user needs to provide to produce an accurate electronic tax return while completely accommodating all the eligible and legitimate deductions. To this end, some embodiments may utilize various pre-fabricated templates each including all the required information for correctly and completely filing a tax return but the specific information that only the user is aware of but cannot be derived from any other information provided by the user or from other publicly available sources. These embodiments may then populate such specific information into one or more fields in the pre-fabricated templates and complete the electronic tax return or at least the corresponding portion accordingly.

Once the electronic return or at least a portion thereof is completed, an anomaly check may be performed at 208 on the electronic return or the portion thereof to determine whether the electronic return or the portion thereof includes any incorrect or questionable information or misses any information that should have been included. More details about anomaly checks are described below with reference to FIG. 5.

Figure 3:
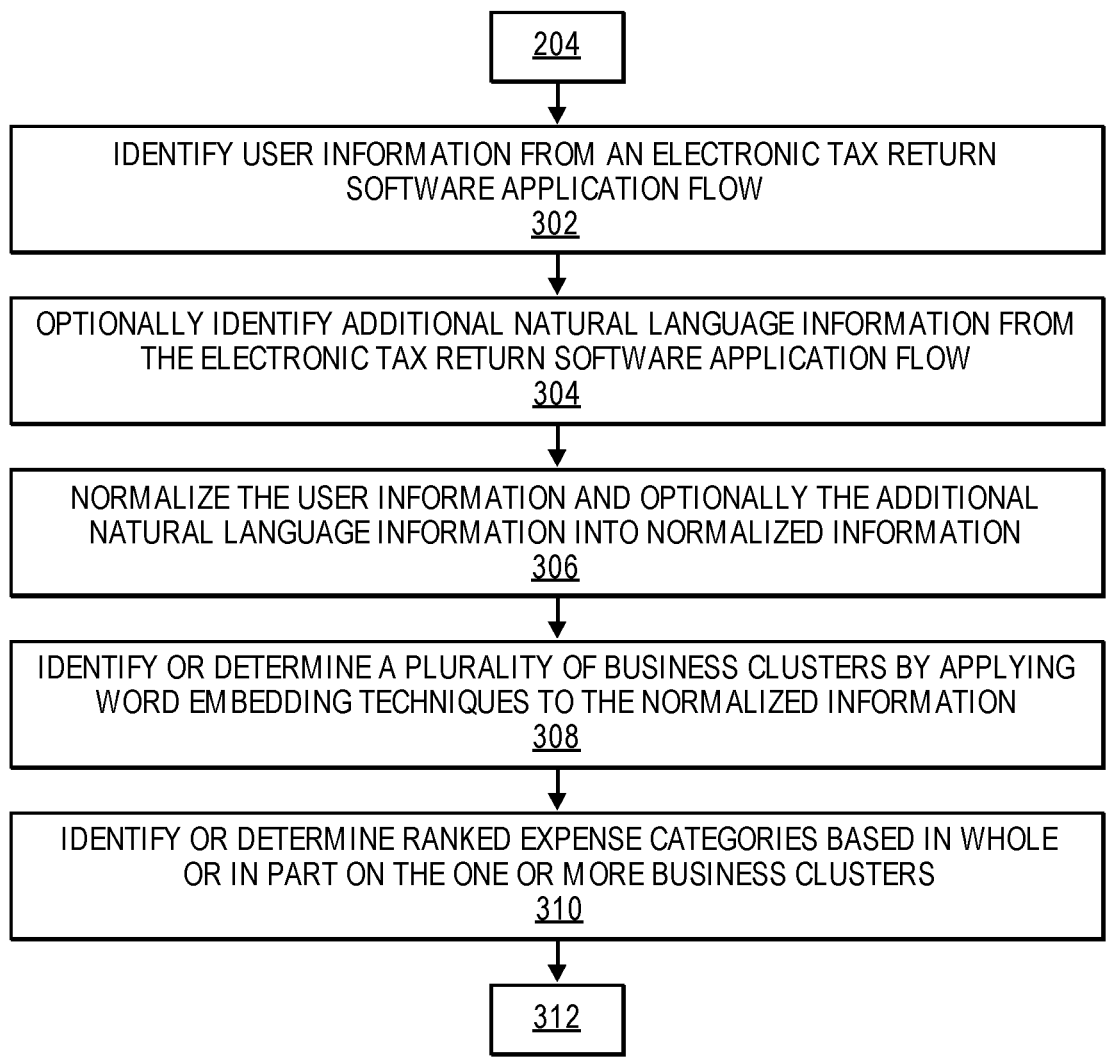
FIG. 3 illustrates more details about a portion of the flow diagram illustrated in FIG. 2 in one or more embodiments.
Figure 4:
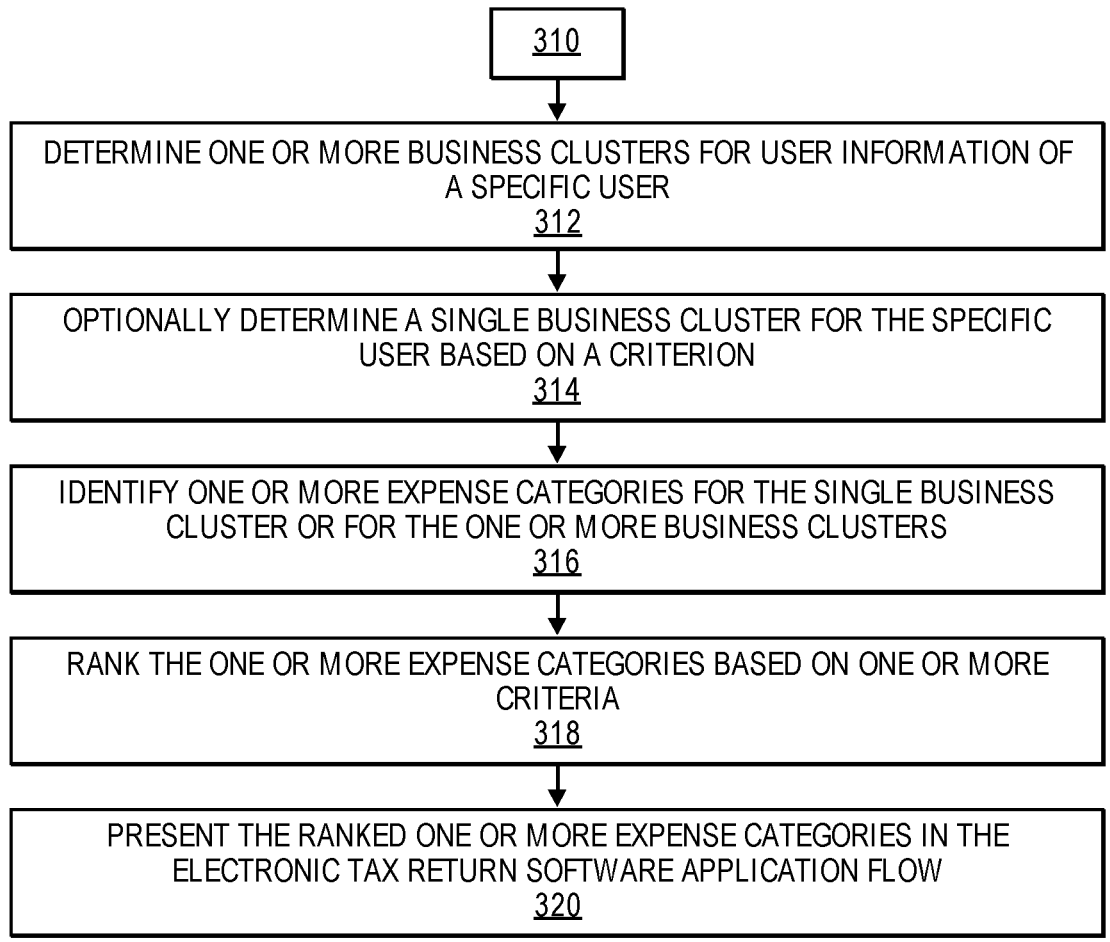
FIG. 4 illustrates more details about a portion of the block diagram illustrated in FIG. 3 in some embodiments.

FIGS. 3-4 jointly illustrate more details about a portion of the flow diagram illustrated in FIG. 2 in one or more embodiments. More specifically, FIGS. 3-4 jointly illustrate more details about the determination of user clusters and expense clusters. In these embodiments illustrated in FIGS. 3-4, user information may be identified at 302 from a plurality of users accessing an electronic tax return software application delivery model.

The user information may include, for example, Field A "Principal business or profession, including product or service" of Schedule C, Form 1040, 1040NR, or 1041, the "organization's mission" in Part III-(1) of Form 990, the sections entitled "Business or activity to which this form relates" and "Description of property" in Item 6, Part I of Form 4562, the section entitled "Description of donated property" in Part I of Form 8283, etc. Such user information may be aggregated and stored in a central repository such as a single data structure in some embodiments or in multiple linked data structures.

For example, the user information identified at 302 may be stored in a single database including a user column that stores unique identifiers or employer identification number (EIN) of a plurality of users where each unique identifier corresponds to, for example, description business or profession in a first column, description of expenses in a second column, identifications of or links to one or more user clusters to which the user may be classified in a third column, identifications of or links to one or more expense categories for the particular user or for the one or more user clusters in a fourth column, any other information provided by the user, any information derived from other information or data, or any other suitable information in some embodiments. The unique user identifiers (or EIN) may be used as the primary key of the database for database manipulations and operations.

In some other embodiments, the aforementioned information or data may be stored in a plurality of data structures that are linked by, for example, the unique user identifications (e.g., the tax identification numbers) that may also serve the function of keys or indices for additional operations) in some other embodiments. Such additional information may include any information provided by users in natural language and is not used in determining user clusters.

Optionally, additional information that is also expressed in natural language may also be identified at 304. This addition information optionally identified at 304 may be further used to verify, fine tune, or modify the user clusters (e.g., business clusters) and/or the expense categories (e.g., expense clusters). For example, such additional information may be similarly processed as the user information for clustering purposes to determine the accuracy of the user clusters and/or the expense categories or to generate one or more additional user clusters and/or expense categories in place of or in addition to existing user clusters and expense categories.

In some embodiments, such additional information may include any natural language entries provided in any tax forms such as those illustrated in FIGS. 6A-6K, any statements that are required by various tax forms and are provided by users, etc. For example, Internal Revenue Service (IRS) Form 255 requires a statement how much noncash income was determined in Item #21; IRS Form 1065 also requires a statement for the income (e.g., Item #4 and 7) and the deductions (e.g., Item #20); etc. In some embodiments, these statements may be provided by some users. In some other embodiments, various techniques described herein automatically determine whether one or more of these statements are needed for completing the tax return and obtains the minimal amount or at least a reduced amount of information from the user to complete these statements.

The user information and optionally the additional natural language information may be normalized into normalized information at 306. Normalization of the information transforms the tokens (e.g., characters, words, phrases, sentences, paragraphs, or even documents) in the information into a normal, canonical, or standard (collectively standard) form that uniquely represents the token as well as one or more other equivalent tokens. For example, all characters in the data set may be mapped to the Unicode expression; letters may be transformed into the lower case; different tenses of the same verb (e.g., fly, flies, flew, flown) may be converted into the same tense (e.g., fly); and/or singular and plurality tokens may be transformed into the same form (e.g., singular); etc. Normalization thus not only transforms tokens into standard forms but also reduces the size of the data set due to, for example, the transformation of various tenses of verbs into the same tense and transformation of plural nouns into singular forms.

In addition or in the alternative, one or more reduction techniques may be applied to the data set or the normalized data set to further reduce the size. For example, punctuations may be removed. In some embodiments, one or more stop or function words or phrases (e.g., auxiliary verbs, some pronouns such as which, what, I, you, she, he, we, etc.) and/or one or more lexical words or lexical phrases that have little or ambiguous meaning may be filtered out from subsequent processes such as vectorization and clustering. Names of named entities (e.g., New York Times as the newspaper) may also be optionally extracted although the subsequent word embedding processing may nevertheless learn these names.

These filtered out words or phrases may be determined not to add value or usefulness. Stop or function words and phrases contribute primarily to the grammatical structures of tokens, rather than the meanings or contents thereof. More details about normalization are described in the U.S. patent applications listed in the section entitled "Cross Reference to Related Applications" and are hereby explicitly incorporated by reference for all purposes.

A plurality of business clusters for the plurality of users may be identified (if already existing) or determined (if not yet existing) at 308 by applying word embedding techniques to the normalized information. In some embodiments, the application of word embedding techniques to the normalized information transforms the tokens in the normalized information into vector representations in a vector space.

The word embedding techniques transform more similar tokens in the normalized information into vectors representations that are in closer proximity in terms of the respective directions and magnitudes of these vector representations but not necessarily in terms of their respective origins in the vector space. More details about the application of word embedding techniques are described in the U.S. patent applications listed in the section entitled "Cross Reference to Related Applications" and are hereby explicitly incorporated by reference for all purposes.

A plurality of expense categories may be identified (if already existing) or determined anew (if not yet existing) at 310 for the plurality of business clusters. These one or more expense categories may be ranked as previously described. In some embodiments, each business cluster is separately processed to determine one or more expense categories therefor. In these embodiments, the natural language descriptions of expenses provided by users in a business cluster may be identified and similarly normalized, vectorized, and clustered into one or more expense categories for this specific business cluster. In some other embodiments, a plurality of expense categories may be determined for the plurality of business clusters as a whole. In these latter embodiments, the natural language descriptions of expenses provided by users in all of the plurality of business cluster may be identified altogether and similarly normalized, vectorized, and clustered into plurality of expense categories for the plurality of business clusters as a whole.

Acts 302 through 310 determine the plurality of business clusters and the plurality of expense categories for a plurality of users of an electronic tax return preparation and filing software application delivery model. These clusters may be determined with historical data of one or more prior versions of the electronic tax return preparation and filing software application delivery model. Some embodiments may further update such clusters with the current information of the current version of the electronic tax return preparation and filing software application delivery model. Each business cluster corresponds to one or more expense categories that may be further ranked as described above. The plurality of business clusters and the plurality of expense categories identified or determined above may be used to aid specific users in preparing their electronic tax returns in the electronic tax return preparation and filing software application delivery model.

At 312, one or more business clusters may be determined for the user information of a specific user identified at 202. A single business cluster for the specific user may be optionally determined at 314 based in part or in whole upon a criterion. For example, the single business cluster may be determined via validation by the specific user or by using other information (e.g., additional natural language inputs provided by the specific user in the electronic tax return preparation and filing software application delivery model) that may be similarly processed by word embedding techniques to determine the single business cluster that better or best fits such other information. For example, similarity scores (e.g., a metric as measured by cosine similarity) may be determined between such other information and the plurality of business clusters (e.g., between such other information and the respective exemplars of these one or more business clusters). Alternatively, distance values between the vector representation of such other information and those of respective exemplars of the plurality of business clusters may be determined to select the single business cluster for the specific user.

One or more expense categories may be identified at 316 for the one or more business clusters or the optionally determined single business cluster for the specific user. Because a plurality of expense categories has been determined for a plurality of users at 310, these one or more expense categories may be selected at 316 from the results of 310 for each business cluster of the one or more business clusters (e.g., selecting top N expense categories for each business cluster) determined at 310 or the single expense category optionally determined at 314.

These one or more expense categories identified at 316 may be optionally ranked at 318 based on one or more criteria in an identical or substantially similar manner as that described in FIG. 2. For example, expense categories may be ranked based on the percentage or number of similar businesses whose previously or currently tax return include deductions in these expense categories. As another example, expense categories may be ranked based on respective amounts claimed by similar businesses in a business cluster their previous or current tax returns. Other criteria such as one or more weighted combinations of a plurality of criteria may also be used to rank the expense categories to reflect the corresponding significance of these expense categories for the users. At least one of the one or more expense categories may then be presented at 320 as a recommended expense category to the specific user in the electronic tax return software application flow.

Figure 5:
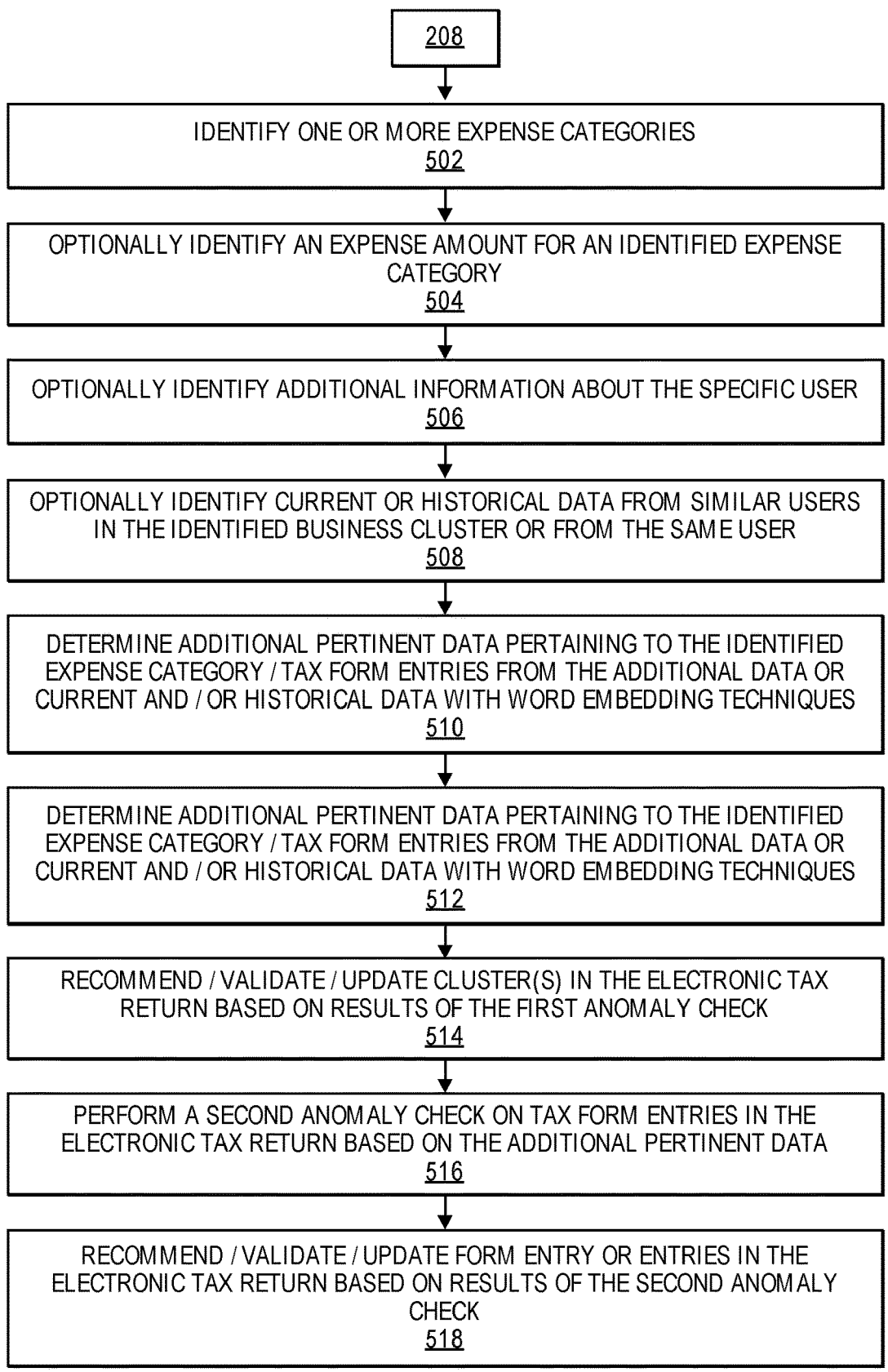
FIG. 5 illustrates more details about another portion of the flow diagram illustrated in FIG. 2 in one or more embodiments.

FIG. 5 illustrates more details about another portion of the flow diagram illustrated in FIG. 2 in one or more embodiments. More specifically, FIG. 5 illustrates more details about anomaly checks. In these embodiments, one or more expense categories may be identified at 502 from an electronic tax return of a specific user in an electronic tax return preparation and filing software application delivery model. These one or more expense categories may be presented by a word embedding module to the specific user and eventually selected by the specific user to place in the electronic tax return. An expense amount may be optionally identified at 504 in the electronic tax return for the specific user. This expense amount may be provided by the specific user in, for example, the specific user's response to a personalized interview flow or chat session for specific information to populate various tax forms or fields in the electronic tax return of the specific user.

Additional information about the specific user may be identified at 506. This additional information may be identified at 506 from various inputs provided by the specific user. In some embodiments, the additional information may include the information provided by the specific user in response to one or more personalized interviews or chats inquiring into specific information (e.g., exact deduction amounts, description of properties, etc.) Strictly as an example, the user may have provided such additional information in Section A "Principal business or profession" (e.g., 602A in FIG. 6A) of Schedule C, Form 1040, a smaller portion of which is used in determining one or more business clusters into which the specific user may be classified. The remaining information may be used as the additional information identified at 506.

The additional information may also include information provided in Part V "Other Expenses" (e.g., 602B and 604B in FIG. 6B) in Schedule C, Form 1040, "Business or activity to which this form relates" (e.g., 602C in FIG. 6C) and "Description of property" (e.g., 604C in FIG. 6C) of IRS Form 4562 (for depreciation and amortization), description of donated property (e.g., 602D in FIG. 6D) in Part I of IRS form 8283 (for noncash charitable contributions), description of property (e.g., 602E in FIG. 6E), "brief summary of the overall physical condition of the property at the time of the gift" (e.g., 604E in FIG. 6E) in sub-section 5 of IRS form 8283, "Summary of the organization's mission or most significant activities" (e.g., 602F in FIG. 6F) in Part 1 of IRS Form 990, the description of "the organization's mission" (e.g., 602G in FIG. 6G) and the description of the "organization's program service accomplishments" (e.g., 604G in FIG. 6G) of IRS Form 990, "Description of services" in Section B of IRS Form 990 (e.g., 602H in FIG. 6H), etc.

It shall be noted that the aforementioned specific pieces of additional information are provided strictly as examples, and that the additional information identified at 506 may include any other information that may be used to check, validate, correct, and determine anew the data provided in electronic tax returns.

Current and/or historical data from the specific user or from other similar users in the one or more business clusters to which the specific user is also classified may be optionally identified at 508. This additional information optionally identified at 506 and/or the current and/or historical data optionally identified at 508 may be similarly processed at 510 by one or more word embedding modules into additional pertinent data. These one or more word embedding modules may reside on a single computing system, in a distributed computing environment, in a parallel computing paradigm, or in an Internet-based computing environment that provides these one or more word embedding modules as shared computer processing resources and data to other computing systems or devices on demand (e.g., in a cloud computing environment).

These one or more word embedding modules may, for example, normalize the information or data to be processed into normalized data comprising a plurality of unique tokens. Each unique token may be transformed into an additional vector representation in the same vector space that also includes the vectors for the plurality of users and various other tokens used to determine expense categories. A similarity metric may be determined between the additional vector representation of a unique token and another vector represented in the electronic tax return.

For example, a similarity metric may be determined between the additional vector and an exemplar vector that is selected to represent a business cluster corresponding to a plurality of similar businesses. An exemplar includes a business description in natural language and is selected from a plurality of business descriptions for a business cluster to represent the business cluster. An exemplar vector representation includes a vector representation that is determined by transforming the natural language description of the exemplar by a word embedding module. An example of an exemplar for an example business cluster of "sports coach" may be "basketball coach" while the "sports coach" business cluster may further include business or profession description such as yoga trainer, swim coach, tennis coach, etc.

A similarity metric measures the similarity or dissimilarity between two vector representations and may include, for example, a distance value (e.g., the Levenshtein distance, a formal distance metric defined by the cosine of the angle between two vector representations, etc.), a similarity value (e.g., cosine similarity measuring the cosine of an angle between two vector representations), a soft cosine measure, or any other suitable measures between two vectors in the vector space (e.g., an Euclidean space, an inner product space or a normed vector space).

A first anomaly check may be performed at 512 on one or more clusters (e.g., one or more business clusters and/or one or more expense categories) in the electronic tax return of the specific user. In clustering various natural language information into, for example, business clusters and expense categories, similar natural language description are transformed into vector representations in closer proximity and thus have a high similarity metric (or a low similarity metric depending on what the similarity metric measures).

In this aspect, these techniques described herein determine the additional pertinent data pertaining to the identified business clusters or the expense categories to determine whether one or more additional clusters should be or may be included but are not included in the electronic tax return in some embodiments. In In these embodiments, these techniques are to identify clusters that are more similar to each other based on the input information and may thus determine whether the additional pertinent data lead to one or more additional clusters that should be or may be included but were not included in the initial clustering of business clusters and/or expense categories in the electronic tax return for the specific user. New clusters may thus be identified recommended at 514 to the specific user, or the list of recommended clusters may thus be updated at 514, after optional validation of these new clusters.

In anomaly checks, one objective is to identify information that indicates dissimilarity between the specific user and one or more identified clusters (e.g., business clusters and/or expense categories). In this aspect, these techniques described herein determine the additional pertinent data pertaining to the identified business clusters or the expense categories to determine whether an identified cluster in the electronic tax return is less likely or erroneously presented to the specific user in view of the additional pertinent data but is nevertheless included in the electronic tax return. For example, these techniques may determine the similarity metric between the additional pertinent data and an identified cluster presently in the electronic tax return. If the similarity metric indicates greater dissimilarity between the additional pertinent data and a specific cluster, the one or more word embedding modules may determine that this specific cluster is less likely to be included in the electronic tax return.

Another objective of anomaly checks is to identify one or more expenses that users typically should not have included in their respective tax returns. For example, expenses on haircuts may not be claimed unless such haircuts are specifically for the performance of work related tasks. In this example, these techniques may recognize that a user claimed haircut expenses in the tax return and may provide additional information (e.g., reminders about the risks of audit, eligibility, and/or requirements of such expenses) and/or one or more additional flow nodes to ask the user to further verify or confirm whether such expenses should be presented in the tax return.

In presenting recommended clusters to the specific user, this specific cluster may thus be scratched from the recommended clusters. In anomaly checks, this specific cluster may be removed, and the list of recommended clusters may be updated, after the optional validation at 514.

A second anomaly check may be performed at 516 on one or more entries in the electronic tax return. The second anomaly check may include checking specific entries in the electronic tax return of the specific user against the user's prior tax returns, against corresponding entries of one or more other users in the same business cluster, etc. When some discrepancies are identified during the second anomaly check, a personalized interview or chat screen or window may be presented to information the specific user of the discrepancies, to ask the specific user for validation and/or correction, to present recommended entries to the specific user, etc. at 518.

Based on the specific user's response, one or more decision flow nodes and/or content propagation flow nodes may be generated if the specific user's response requires additional actions or information. For example, the specific user's response may indicate that the specific entry at issue is correct, yet these techniques determine that an additional statement is required by the tax code. In this example, these techniques may generate one or more additional interview or chat screens or windows to ask for the minimal or reduced amount of information from the specific user, and then use the minimal or reduced amount of information to automatically generate the additional statement on behalf of the specific user or for the specific user to review. The entries and any required additional data may be updated after the optional validation by the specific user.

FIGS. 6A-6K illustrate some examples that are referenced or produced by various modules described herein in some embodiments. FIGS. 6A-6H illustrate some examples of IRS forms including natural language inputs that may be processed with one or more word embedding modules described above. It shall be noted that these forms illustrated in FIGS. 6A-6H are provided strictly as some examples, and that other forms or documents may also be similarly processed with these techniques described herein with full and equal effects. In addition, word embedding modules perform various processes (e.g., normalization, vectorization, clustering, etc.) on natural language information such as those specific entries in the respective fields illustrated in FIG. 6A-6H. Nonetheless, other data types (e.g., data in image formats, data in audiovisual formats, etc.) may be first captured, transformed, encoded, or decoded with corresponding processes into natural language information that may then be similarly processed by the word embedding modules.

FIG. 6I illustrates an example of a corpus including raw, natural language inputs in Part V "Other Expenses" in Schedule C of Form 1040 by a plurality of users of an electronic tax return preparation software application delivery model (e.g., TURBOTAX® by Intuit, Inc.) In some embodiments, such raw, natural language inputs may be extracted from the collection of all such raw, natural language inputs and aggregated into the corpus of the plurality of users that have been clustered into the same business cluster. This corpus may then be normalized, vectorized, and clustered by using word embedding techniques described above to cluster these raw, natural language inputs into one or more characteristic clusters (e.g., expense categories) for this particular business cluster.

FIG. 6J illustrates an example data structure storing clustering results obtained by using techniques described herein. As FIG. 6J shows, one or more word embedding modules perform the second stage normalization, vectorization, and clustering tasks on various natural language inputs of various expenses provided by a plurality of users in the same user cluster that is determined from the first stage clustering tasks. These natural language inputs are thus clustered into a plurality of clusters each having its own cluster identifier as shown in column 604J. FIG. 6J further demonstrates a third stage clustering on the plurality of clusters for this user cluster.

As FIG. 6J shows, clusters having identifiers 31 and 100 may be further clustered into a super-cluster; and clusters having identifiers 3, 4, 13, 36, 44, 48, and 106 may be clustered into another super-cluster as shown in column 604J. The example data structure further includes the Exemplar(s) column 606J. An exemplar is a natural language input provided by one or more users in the user cluster and selected to represent a specific cluster. Therefore, each user cluster or characteristic cluster has its own exemplar. As column 606J shows, exemplar "classes" represents the cluster having cluster identifier 31; and exemplar "education workshops and online business courses" represents the cluster having cluster identifier 100.

The example data structure further includes the examples column 608J that includes some examples of natural language inputs that are provided by users and clustered by the word embedding module into the specific clusters. The example data structure may also include a descriptive summary 602J for each super-cluster; and the descriptive summary may be automatically composed from the natural language inputs clustered into this super-cluster.

Figure 6C:
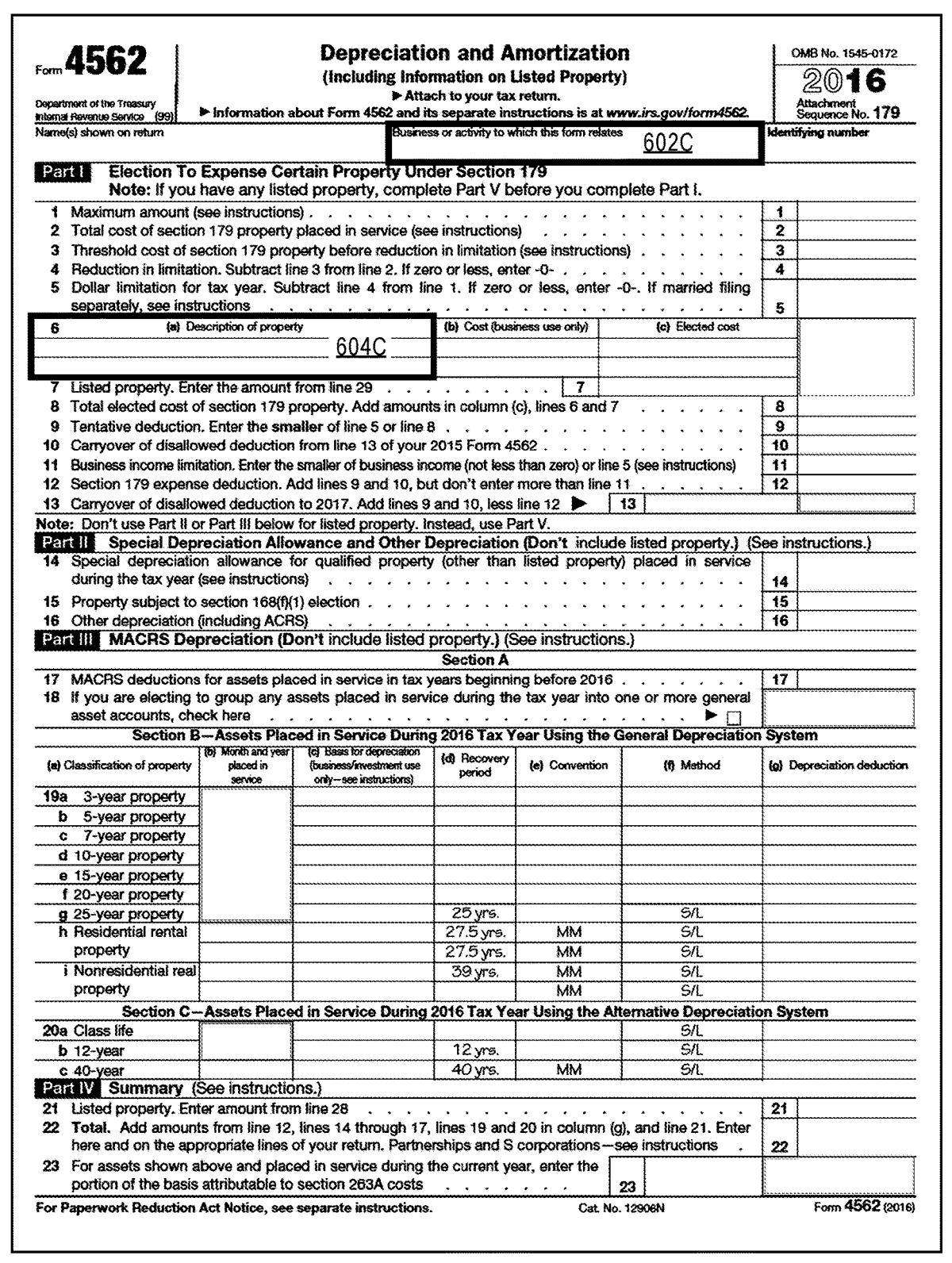
Figure 6D:
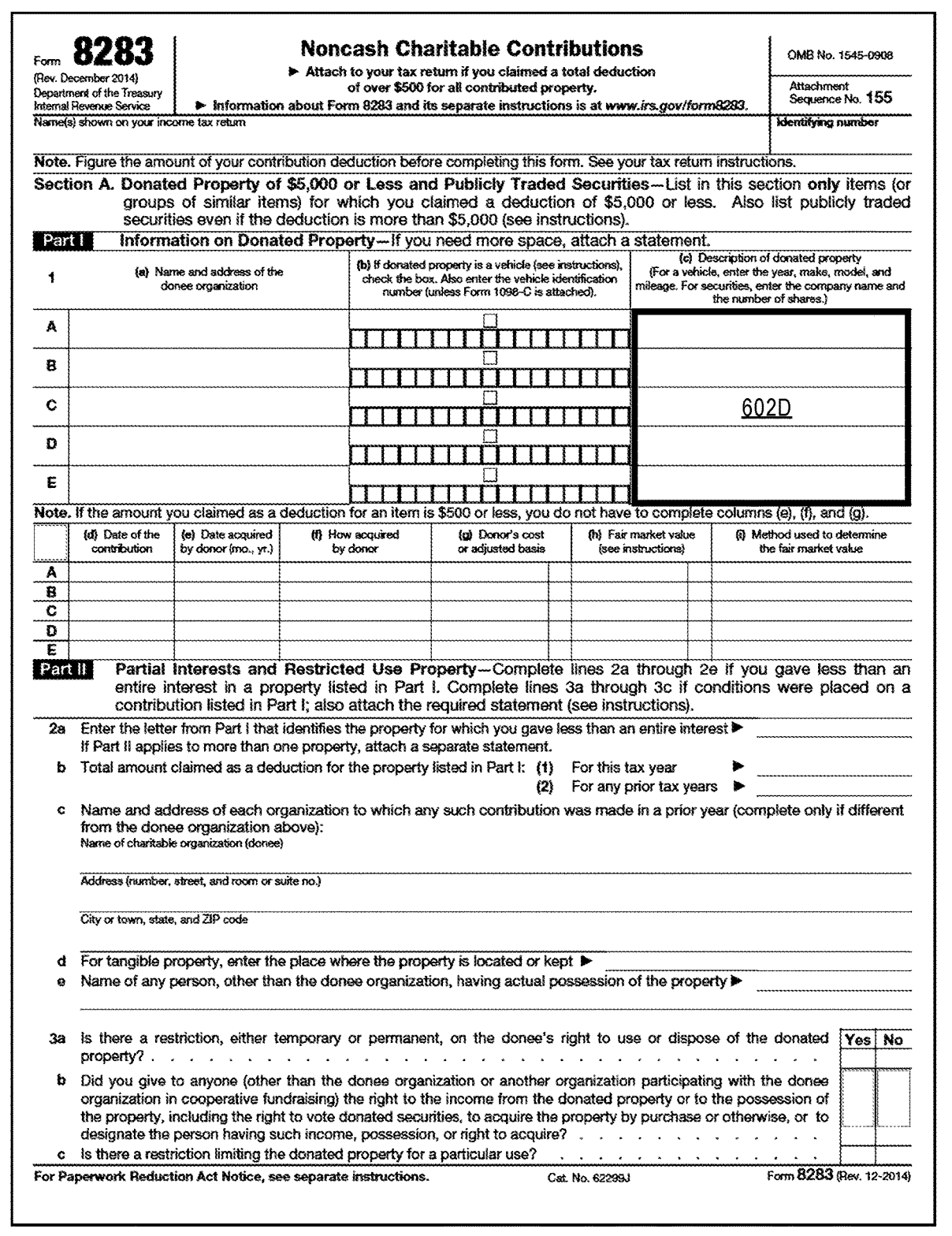
Figure 6E:
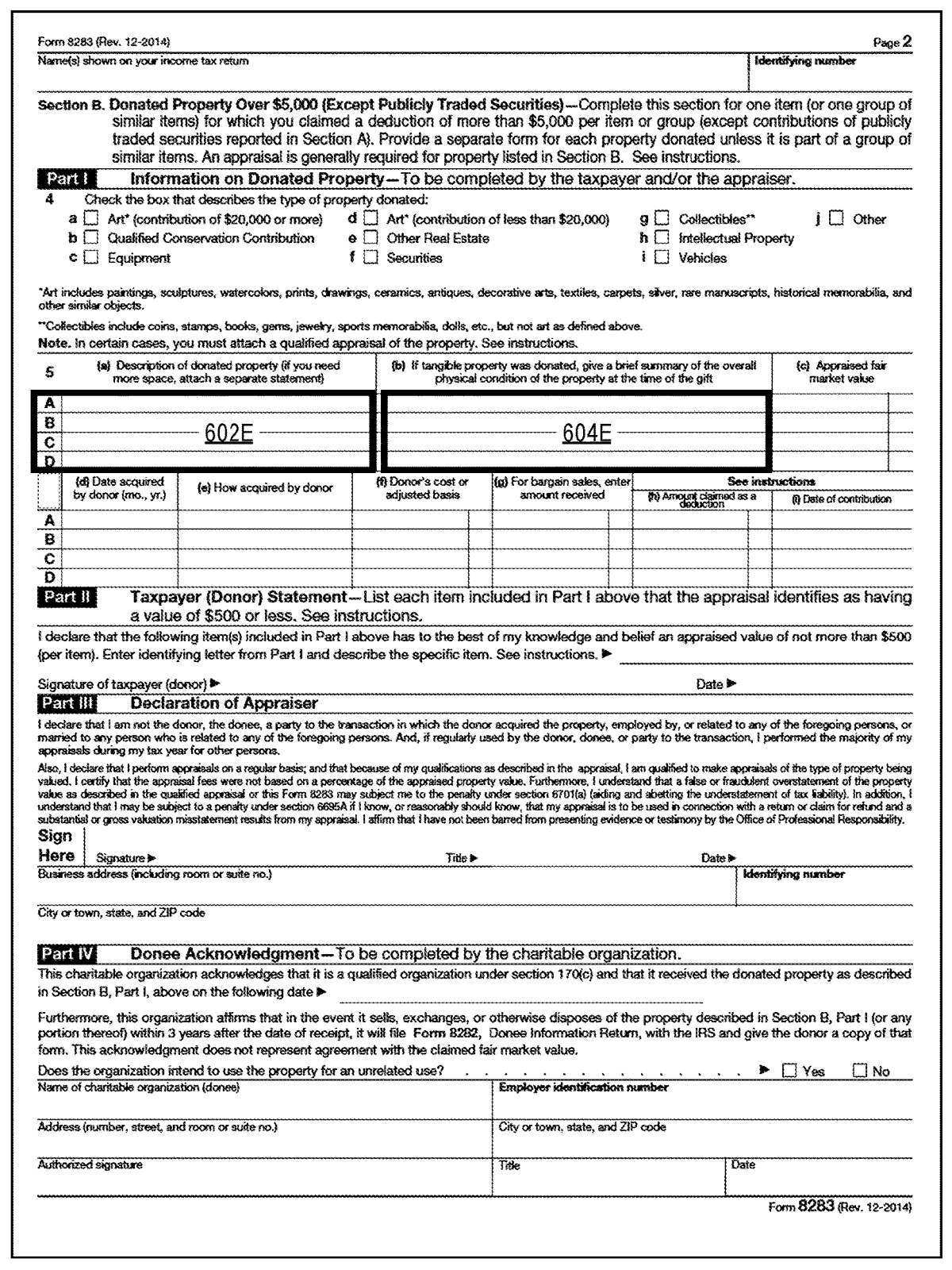
Figure 6K:
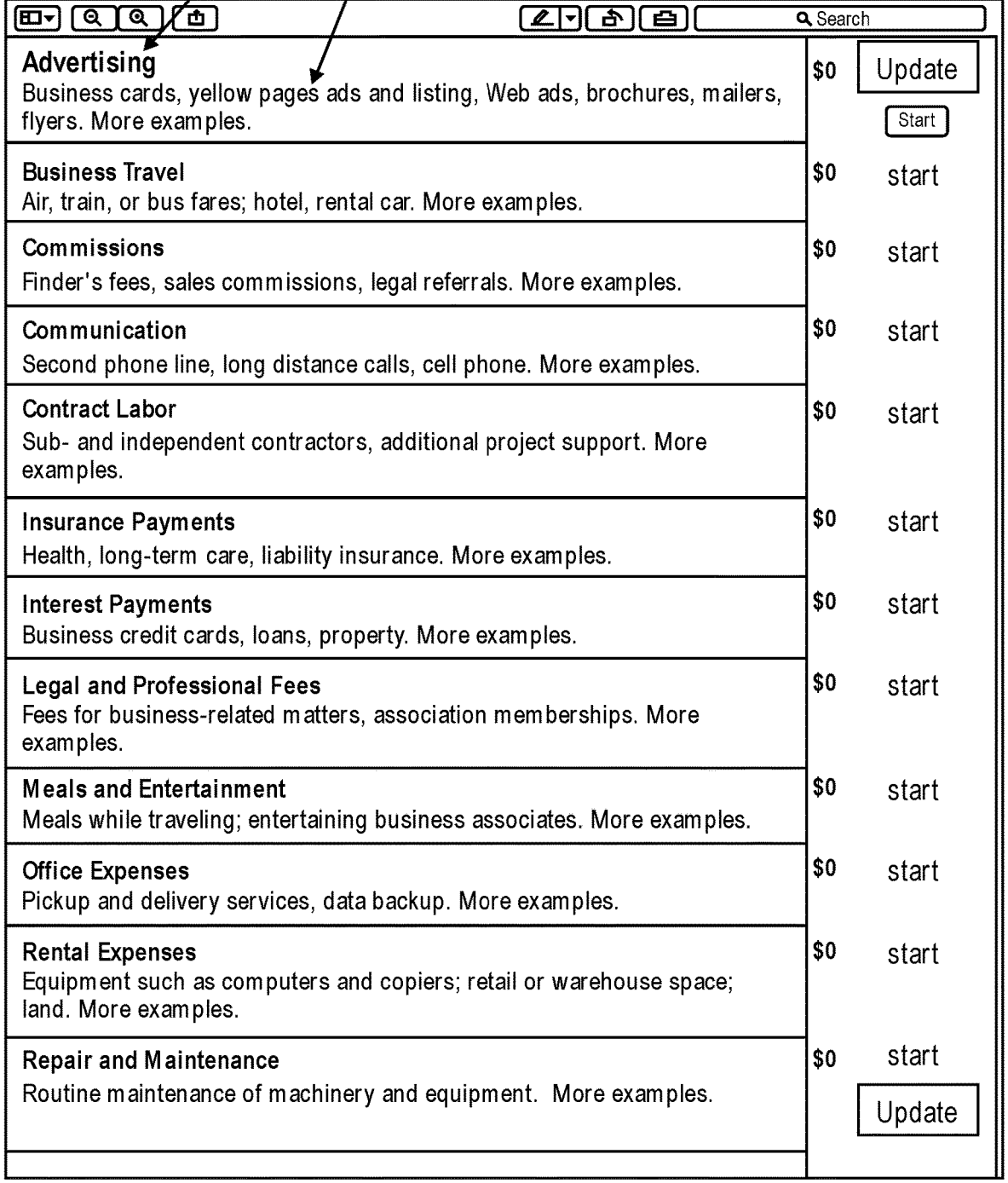

FIG. 6K illustrates some examples of expense categories for a user cluster determined by one or more word embedding modules described above in some embodiments. As described above, these expense categories 602K may be determined by one or more word embedding modules performing normalization, size reduction, vectorization, and clustering on various natural language inputs provided by a plurality of users of the same user cluster in Schedule C of Form 1040. FIG. 6K also shows some examples 604K of natural language descriptions that are captured from electronic tax returns and clustered into each characteristic cluster. These natural language descriptions have been determined by the word embedding module to be similar to each other based on the close proximity of their corresponding vector representations.

Figure 7A:
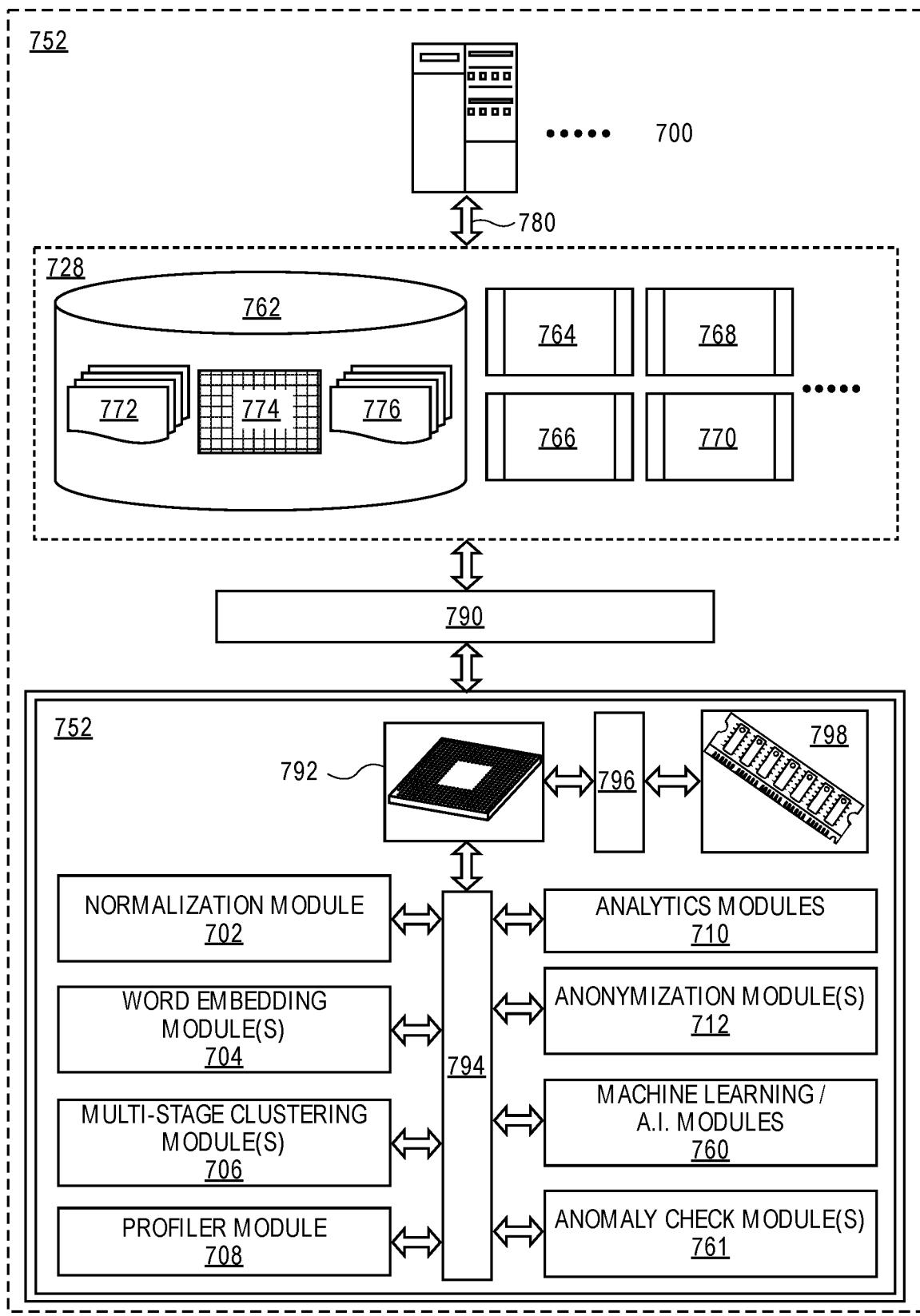
FIG. 7A illustrates an example of a computing system that is configured with specific modules to provide tax return information for an electronic tax return preparation and filing software application delivery model in one or more embodiments.

FIG. 7A illustrates an example of a computing system that is configured with specific modules to providing tax return information for an electronic tax return preparation and filing software application delivery model in one or more embodiments. More specifically, FIG. 7A illustrates an illustrative high level schematic block diagrams for a system for providing tax return information for an electronic tax return preparation and filing software application delivery model and may comprise one or more computing systems 700, such as a general purpose computer described in the System Architecture Overview section to implement one or more special proposes.

The illustrative system in FIG. 7A may include an Internet-based computing platform providing a shared pool of configurable computer processing resources (e.g., computer networks, servers, storage, applications, services, etc.) and data to other computers and devices in an ubiquitous, on-demand basis via the Internet. For example, one or more computing resources and/or modules illustrated in FIG. 7A may be located in a cloud computing platform in some embodiments.

In some embodiments, the one or more computing systems 700 may invoke various system resources such as the processor(s) or processor core(s), memory, disks, etc. The one or more computing systems 700 may also initiate or interact with other computing systems to access, via a computer bus architecture (e.g., a system bus, a control bus, a data bus, or any combinations thereof), various resources 728 that may comprise a database engine 764, a flow controller 766, a flow instance resolver 768, a flow action controller 770, etc. that are coupled to the set of modules 752 to aid the generation, control, and execution of personalized flows of software application delivery models.

The one or more computing systems 700 may further write to and read from a local or remote non-transitory computer accessible storage 762 that stores thereupon data or information such as, but not limited to, one or more databases or data structures (774) such as one or more natural language information data structures, vector representations data structures, clustering result data structures, personalized flow data structures, etc., various statistics, various data or information, various constraints, etc. (772), or other information or data (776) that may be used to facilitate the performance of various functions to achieve the intended purposes.

In some embodiments, the one or more computing systems 700 may include or, either directly or indirectly through the various resources 728, invoke a set of modules 752 including hardware modules and software modules or combinations of one or more hardware modules and one or more software modules that may comprises one or more normalization modules 702 that normalize an input data set of a plurality of data items into a normalized data set, one or more word embedding modules 704 that embed various pieces of information into a vector space. In some embodiments, the one or more normalization modules 702 may be a part of one or more word embedding modules 704.

The set of modules 752 may further optionally include one or more multi-stage modules 706 to cluster various pieces of information into one or more clusters (e.g., user clusters, characteristic clusters, personalized information clusters, etc.) The set of modules 752 may also include one or more profiling modules 708 to generate profiles for users and to aggregate various other information or data (e.g., vector representations, clustering results, etc.)

The set of modules 752 may also include one or more analytics modules 710 to perform analytics on one or more corpora and/or on various vector representations in tandem with, for example, one or more word embedding modules 704. The set of modules 752 may also include one or more anonymization modules 712 to anonymize or de-sensitize various pieces of information or data. In addition or in the alternative, this set of modules 752 may include one or more machine learning or artificial intelligence (A.I.) modules 760 to that may be used to train the one or more normalization modules 702, the word embedding modules 704, and/or the multi-stage clustering modules 706. More details about training one or more of these modules are described in the U.S. patent applications listed in the first paragraph entitled Cross Reference to Related Applications The set of modules 752 may also include one or more anomaly check modules 761 to perform various checks on a software application delivery model. For example, an anomaly check module 761 may check the data entered by users to determine whether the entered data (e.g., expense description, expense amounts, etc. in an electronic tax return preparation and filing software application delivery model) includes any anomalies.

In some embodiments, the computing system 700 may include the various resources 728 such that these various resources may be invoked from within the computing system via a computer bus 780 (e.g., a data bus interfacing a microprocessor 792 and the non-transitory computer accessible storage medium 798 or a system bus 790 between a microprocessor 792 and one or more engines in the various resources 728). In some other embodiments, some or all of these various resources may be located remotely from the computing system 700 such that the computing system may access the some or all of these resources via a computer bus 780 and one or more network components.

The computing system may also include one or more modules in the set of modules 752. One or more modules in the set 752 may include or at least function in tandem with a microprocessor 792 via a computer bus 794 in some embodiments. In these embodiments, a single microprocessor 792 may be included in and thus shared among more than one module even when the computing system 700 includes only one microprocessor 792. A microprocessor 792 may further access some non-transitory memory 798 (e.g., random access memory or RAM) via a system bus 796 to read and/or write data during the microprocessor's execution of processes.

Figure 7B:
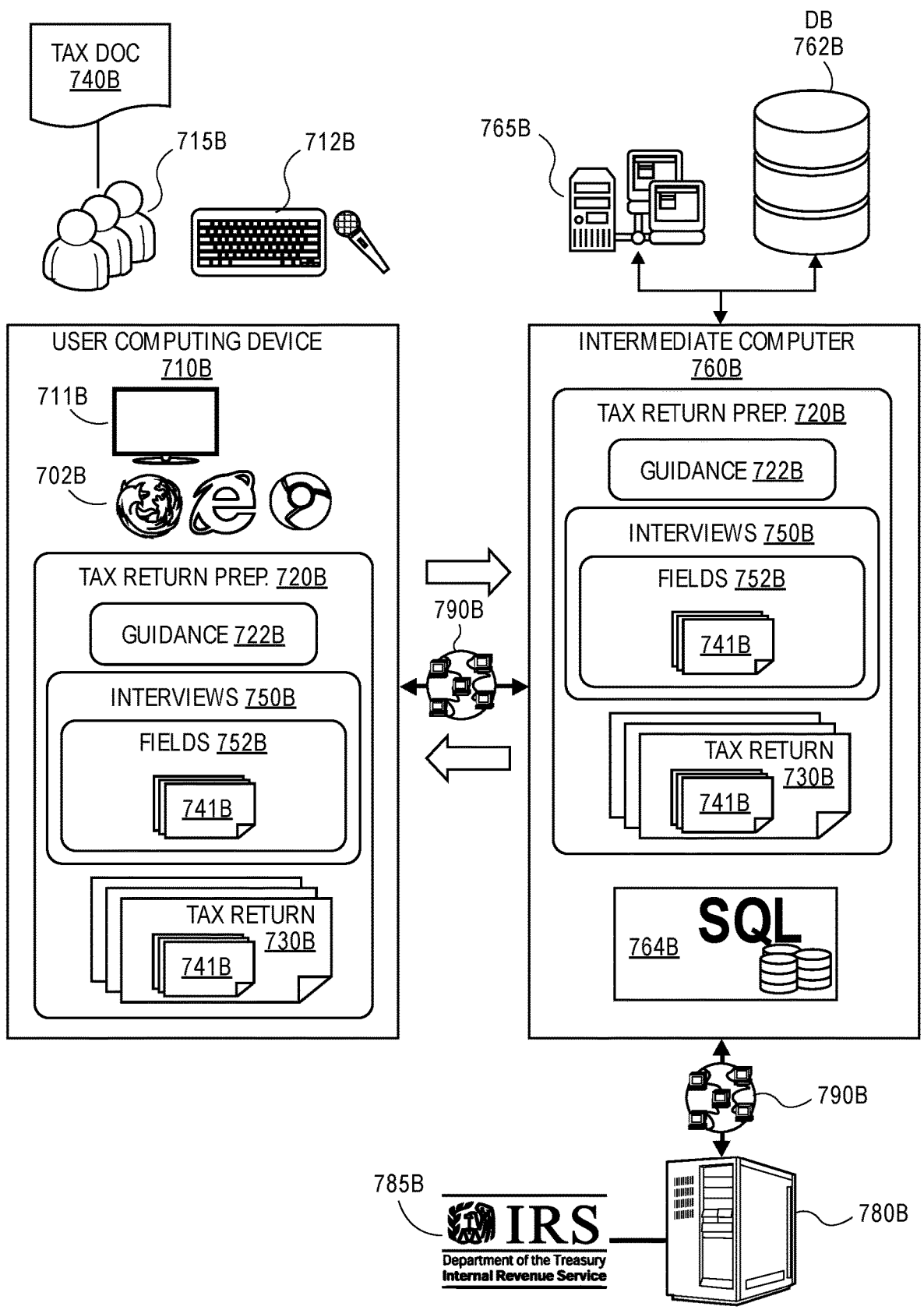
FIG. 7B illustrates another example of a computing system that is configured with specific modules to provide tax return information for an electronic tax return preparation and filing software application delivery model in one or more embodiments.

Referring to FIG. 7B, in a computerized system 700B programmed, configured or constructed according to one embodiment and components thereof that are utilized or involved in providing tax document guidance to a user 715B of a tax preparation application 720B comprises or involves a computing device 710B of the user or taxpayer 715B executing the tax return preparation application 720B. The tax preparation application 720B is operable to prepare an electronic tax return 730 based on tax data 741B from one or more tax documents 740B.

The tax preparation application 720B may include a standalone installation that locally executes locally on the user computing device 710B in some embodiments. In some other embodiments, the tax preparation application 720B may be hosted on an intermediate computer (e.g., 760B), in a cloud environment (not shown), or provided as a service (e.g., software as a service or SaaS); and the user 715B may access the tax preparation application 720B via a browser 702B on a display 711B of the user computing device 710B. FIG. 7B thus illustrates different, alternative software application delivery models for the tax preparation application 720B. The user 715B may be the actual taxpayer or other user such as a tax professional, accountant or attorney preparing the electronic tax return 730B on behalf of the taxpayer. Furthermore, In addition, the user 715B may include a natural person or an entity (e.g., a corporate entity).

For ease of explanation, reference is made generally to a user 715B of the tax preparation application 720B.

The user's computing device 710B may be a desktop, laptop or other computer or computing apparatus, or a mobile communication device such as a tablet computing device, smartphone, or other mobile communication device executing a software program or mobile application for the tax return preparation application 720B or executing a browser to access an on-line version of the tax return preparation application 720B. Examples of tax return preparation applications 720B that may incorporate or utilize embodiments include a desktop version of TURBOTAX® tax return preparation application and an online version available at turbotax.com, both of which are available from Intuit Inc.

Tax return preparation applications 720B such as TURBOTAX® tax return preparation application generate a series of interview screens 750B displayed on a screen 711B of the user's computing device 710B and that present questions and fields 752B for the user 715B to enter tax data 741B into a field 752B or import or transfer tax data 741B from an electronic source such as a prior year electronic tax return or an electronic file of a financial management system (FMS) such MINT®, QUICKEN®, and QUICKBOOKS® financial managements systems. MINT®, QUICKEN®, and QUICKBOOKS® are also registered trademarks of Intuit, Inc. The user 715B may manipulate one or more input devices 712B in order to navigate interview screens 750B and/or enter or import tax data 741B into respective fields 752B. Examples of input devices 712B that may be utilized for this purpose include a computer mouse that generates a pointer, a keyboard (e.g., a "tab" key or by use of a pre-determined key), and/or voice input and recognition device (e.g., a microphone operatively attached to the user computing device 710B).

The host 765B of the intermediate computer 760B may be the provider of the tax preparation application 720B such as TURBOTAX® of Intuit, Inc. While FIG. 7B illustrates an embodiment in which the tax preparation application 720B is a desktop version executing on the user's computing device 710B that is in communication with the intermediate computer 760B, embodiments are not so limited such that in other embodiments, the intermediate computer 760B hosts an on-line version of the tax preparation application 720B (such as turbotax.com) that can be accessed by a browser executing on the user's computing device 710B.

For ease of explanation and illustration, reference is made to the system configuration shown in FIG. 7B in which the tax preparation application 720B executes on the user's computing device 710B, and as described in further detail below, the intermediate computer 760B may be in communication with the user's computing device 710B to transmit, for example, one or more templates (e.g., a tax document template), one or more interview screens with personalized information or contents, one or more online chat sessions empowered by a chatbot engine that impersonates a human domain experts in automatically generating chat questions and response to users, to the user's computer 710B for processing or display by the tax preparation application 720B or browser 702B.

FIG. 7B also illustrates the intermediate computer 760B in communication with one or more databases 764B storing various pieces of information or data. For example, these one or more databases 762B may store natural language inputs provided by users of one or more software application delivery models (e.g., the tax return preparation software application delivery models 720B, accounting software application delivery models, financial management software application delivery models, etc.) The one or more databases 762B may further store vector representations of various pieces of natural language inputs (e.g., descriptions of users, businesses, professions, description of various expenses claimed by the users, etc.)

In addition to these vector representations, the one or more databases 762B may further store clustering results of the aforementioned various pieces of natural language inputs as well as custom clustering results with respect to customarily specified clustering criteria. These one or more databases 762B may function in tandem with the host 765B and/or the intermediate computer 760B to provide data to or receive data from various modules described herein. According to embodiments, the database images 762B are referenced or indexed such that they are searchable by keywords, key phrases, or identifier lookup or based on mapping of fields of an interview screen 750B and a particular portion of a tax return document 730B.

The intermediate computer 760B may also be in communication with one or more computers 780B of one or more third parties 785B (e.g., one or more tax authorities, financial institutions, payroll departments of employers, etc.) and may serve as an electronic filing server for purposes of electronically filing tax returns 730B with the computer 780B. The one or more third parties 785B with which tax returns 730B are filed may be a federal tax authority such as the Internal Revenue Service (IRS), a state tax authority such as the State Franchise Board of California or other federal, state or local tax collecting entity to which taxes are paid.

Examples of tax documents 740B for a tax authority 785B such as the IRS include: W-2, 1099-A, 1099-B, 1099-C, 1099-DIV, 1099-G, 1099-H, 1099-INT, 1099-OID, 1099-LTC, 1099-PATR, 1099-Q, and 1098. It should be understood that these tax documents 740B are provided as illustrative examples, different tax collecting entities utilize different tax documents 740B, and embodiments may be utilized to process and provide guidance (722B) for various tax documents 740B from various tax authorities of the one or more third parties 785B. For ease of explanation, reference is made generally to a third party 785B and a tax document 740B, a particular example is a tax document 740B in the form of a wage and tax statement such as Form W-2, but embodiments are not so limited.

Computing devices or computers 710B and 780B are in communication with the intermediate computer 760B through respective networks 790B (generally, network 790B). Each of the networks 790B and other networks discussed herein may be different, or two or more networks 790B may be the same depending on the system configuration and communication protocols employed. One or more or all of the networks 790 may be, for example, a cellular network, a wireless network, a Local Area Network (LAN) and/or a Wide Area Network (WAN) or a combination of two or more networks. Reference to a network 790B generally is not intended to refer to a specific network or communications protocol, and it should be understood that embodiments can be implemented using various networks and combinations thereof.

According to embodiments as generally illustrated in FIG. 7B, the tax return preparation application 720B includes guidance module engine or element 722B (generally, "guidance" in FIG. 7B), which is programmed, configured, or operable to present one or more screens to the user 715B through the tax preparation application 720B. As shown in FIG. 7B, the guidance module 722B is a component or module of the tax preparation application 720B, but it may also be hosted or separately executed by the intermediate computer 760B. While the intermediate computer 760B may also host and execute the guidance module 722B including or in communication with the one or more database 762B as described above, for ease of explanation, reference is made to a tax preparation application 720B including or executing a guidance module 722B.

System Architecture Overview

Figure 7C:
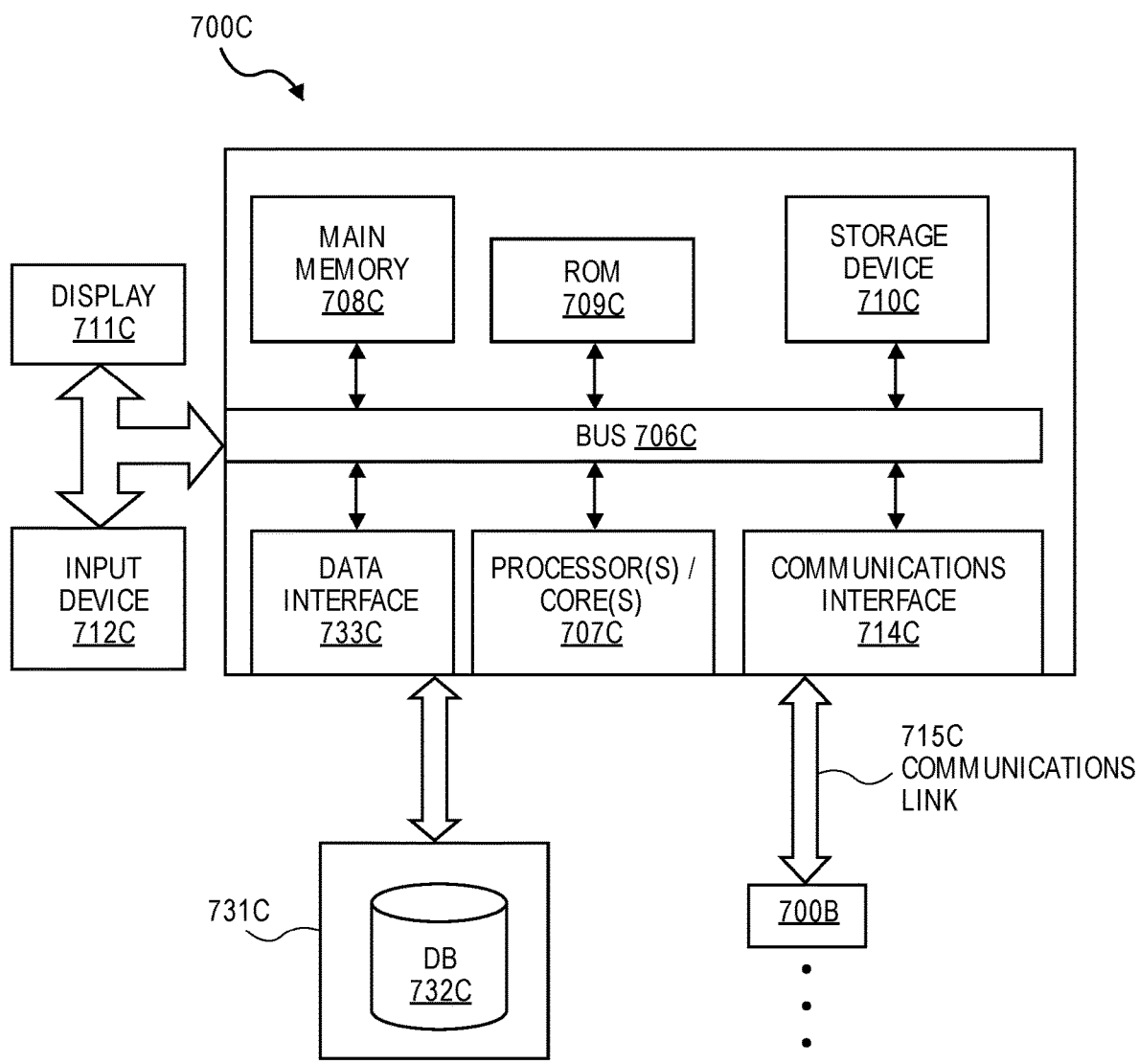
FIG. 7C illustrates a computerized system on which a method for providing tax return information for an electronic tax return preparation and filing software application delivery model may be implemented in one or more embodiments.

FIG. 7C illustrates a block diagram of an illustrative computing system 700C suitable for generating a personalized flow for a software delivery model as described in the preceding paragraphs with reference to various figures. The illustrative computing system 700C may include an Internet-based computing platform providing a shared pool of configurable computer processing resources (e.g., computer networks, servers, storage, applications, services, etc.) and data to other computers and devices in an ubiquitous, on-demand basis via the Internet. For example, the computing system 700C may include or may be a part of a cloud computing platform in some embodiments. Computer system 700C includes a bus 706B or other communication module for communicating information, which interconnects subsystems and devices, such as processor 707C, system memory 708C (e.g., RAM), static storage device 709C (e.g., ROM), disk drive 710C (e.g., magnetic or optical), communication interface 714C (e.g., modem or Ethernet card), display 711C (e.g., CRT or LCD), input device 712C (e.g., keyboard), and cursor control (not shown).

According to one embodiment, computing system 700C performs specific operations by one or more processor or processor cores 707C executing one or more sequences of one or more instructions contained in system memory 708C. Such instructions may be read into system memory 708C from another computer readable/usable storage medium, such as static storage device 709C or disk drive 710C. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 707C, where the one or more processors, one or more processor cores, or combination thereof executes one or more threads. For example, various acts of identifying, various acts of determining, various acts of classifying, various acts of implementing, various acts of performing, various acts of transforming, various acts of decomposing, various acts of updating, various acts of presenting, various acts of modifying, etc. may be performed by one or more processors, one or more processor cores, or combination thereof.

A modules described herein may also be implemented as a pure hardware module (e.g., a block of electronic circuit components, electrical circuitry, etc.) or a combination of a hardware module and a software block that jointly perform various tasks to achieve various functions or purposes described herein or equivalents thereof. For example, a module described herein may be implemented as an application-specific integrated circuit (ASIC) in some embodiments.

In these embodiments, a module may thus include, for example, a microprocessor or a processor core and other supportive electrical circuitry to perform specific functions which may be coded as software or hard coded as a part of an application-specific integrated circuit, ROM (read only memory), PROM (programmable read only memory), EPROM (erasable programmable read only memory), etc. despite the fact that these microprocessor, processor core, and electrical circuitry may nevertheless be shared among a plurality of module. A module described herein or an equivalent thereof may perform its respective functions alone or in conjunction with one or more other modules. A module described herein or an equivalent thereof may thus invoke one or more other modules by, for example, issuing one or more commands or function calls. The invocation of one or more other modules may be fully automated or may involve one or more user inputs.

The term "computer readable storage medium" or "computer usable storage medium" as used herein refers to any non-transitory medium that participates in providing instructions to processor 707C for execution. Such a medium may take many forms, including but not limited to, non-volatile media and volatile media. Non-volatile media includes, for example, optical or magnetic disks, such as disk drive 710C. Volatile media includes dynamic memory, such as system memory 708C. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 700B. According to other embodiments of the invention, two or more computer systems 700C coupled by communication link 715C (e.g., LAN, PTSN, or wireless network) may perform the sequence of instructions required to practice the invention in coordination with one another.

Computer system 700C may transmit and receive messages, data, and instructions, including program, i.e., application code, through communication link 715C and communication interface 714C. Received program code may be executed by processor 707C as it is received, and/or stored in disk drive 710C, or other non-volatile storage for later execution. In an embodiment, the computing system 700C operates in conjunction with a data storage system 731C, e.g., a data storage system 731C that includes a database 732C that is readily accessible by the computing system 700C. The computing system 700C communicates with the data storage system 731C through a data interface 733C. A data interface 733C, which is coupled with the bus 706C, transmits and receives electrical, electromagnetic or optical signals that include data streams representing various types of signal information, e.g., instructions, messages and data. In embodiments of the invention, the functions of the data interface 733C may be performed by the communication interface 714C.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for providing tax return information for an electronic tax return preparation and filing software application delivery model, comprising:
   identifying, by at least one micro-processor of a computing system, a plurality of business clusters and a plurality of expense categories for the plurality of business clusters;
   extracting, by the at least one micro-processor of a computing system, description about a first characteristic of a specific user from an electronic tax return in an electronic tax return preparation and filing software application delivery model, the description expressed in natural language;
   generating, by the at least one micro-processor, a user description vector of at least a part of the description, the user description vector expressing the at least part of the description in a normalized form within a vector space;
   determining, by the at least one micro-processor, one or more business clusters from a plurality of business clusters within the vector space for the specific user by matching the user description vector with the one or more business clusters within the vector space; and
   selecting, by the at least one micro-processor, one or more expense categories for the electronic tax return of the specific user based in part or in whole upon at least one association between the selected one or more expense categories and the matched one or more business clusters.

2. The computer implemented method of claim 1, further comprising:
   normalizing, by the at least one micro-processor, the electronic tax return preparation and filing software application delivery model into a corpus; and
   identifying, by the at least one micro-processor, pertinent natural language information from respective electronic tax returns of the plurality of users.

3. The computer implemented method of claim 2, further comprising:
   normalizing, by the at least one micro-processor, at least one of the corpus and the pertinent natural language information into normalized corpus comprising a plurality of unique tokens; and
   transforming, by the at least one micro-processor, the normalized corpus into a plurality of vector representations in a vector space for the plurality of users.

4. The computer implemented method of claim 3, further comprising:
   determining, by the at least one micro-processor, a plurality of business clusters for the plurality of user by using at least the plurality of vector representations; and
   determining, by the at least one micro-processor, a plurality of expense categories for the plurality of business clusters by using at least the plurality of business clusters.

5. The computer implemented method of claim 4, further comprising:
   identifying, by the at least one micro-processor, the description about the specific user from the electronic tax return of the specific user; and
   identifying, by the at least one micro-processor, additional natural language information about the specific user from a software application flow of the electronic tax return preparation and filing software application delivery model.

6. The computer implemented method of claim 5, further comprising:
   normalizing, by the at least one micro-processor, at least one of the description and the additional natural language information into normalized information comprising one or more unique tokens; and
   transforming, by the at least one micro-processor, the normalized information into a specific vector representation in the vector space for the specific user.

7. The computer implemented method of claim 6, further comprising:
   determining, by the at least one micro-processor, a set of business clusters for the specific user by using at least the specific vector representation;
   ranking, by the at least one micro-processor, the set of business clusters into a set of ranked business clusters based in part or in whole upon one or more first criteria; and
   selecting, by the at least one micro-processor, the one or more business clusters for the specific user from the set of business clusters or the set of ranked business clusters.

8. The computer implemented method of claim 7, further comprising:
   identifying, by the at least one micro-processor, one or more expense categories for the specific user based in part or in whole upon the set of business clusters or the set of ranked business clusters;
   ranking, by the at least one micro-processor, the one or more expense categories into one or more ranked expense categories based in part or in whole upon one or more second criteria; and
   presenting, by the at least one micro-processor, at least one expense category of the one or more expense categories or the one or more ranked expense categories in the software application flow for the specific user.

9. The computer implemented method of claim 1, further comprising:
   identifying, by the at least one micro-processor, one or more first expense clusters from the electronic tax return of the specific user and one or more first business clusters into which the specific user is classified;
   identifying, by the at least one micro-processor, additional natural language information about the specific user; and
   identifying, by the at least one micro-processor, current or historical data from the specific user or a plurality of users in the one or more first business clusters with the specific user.

10. The computer implemented method of claim 9, further comprising:

determining, by the at least one micro-processor, additional pertinent data pertaining to the one or more first expense categories at least by embedding at least one of the additional natural language information and the current or historical data into one or more additional vector representations in the vector space; and performing, by the at least one micro-processor, a first anomaly check on at least one of the one or more first expense clusters and the one or more first business clusters using at least the one or more additional vector representations.

11. The computer implemented method of claim 10, further comprising:

determining, by the at least one micro-processor, whether at least one first cluster is to be removed based in part or in whole on the additional pertinent data that comprises one or more similarity metrics between the one or more additional vector representations and at least one of the one or more first expense clusters and the one or more first business clusters; and validating, by the at least one micro-processor, whether removal of the at least one first cluster is to be performed for the specific user in response to determining that validation of removal of clusters is to be performed.

12. The computer implemented method of claim 11, further comprising:

presenting, by the at least one micro-processor, the at least one first cluster in a first personalized interview or chat window to the specific user in the electronic tax return preparation and filing software application delivery model in response to determining that the at least one cluster is to be removed; and removing, by the at least one micro-processor, the at least one first cluster in response to determining that the at least one first cluster is to be removed.

13. The computer implemented method of claim 10, further comprising:

determining, by the at least one micro-processor, whether at least one second cluster is to be added for the specific user based in part or in whole the additional pertinent data that comprises the one or more similarity metrics between the one or more additional vector representations and the description about the first characteristic of the specific user; and validating, by the at least one micro-processor, whether addition of the at least one second cluster is to be performed for the specific user in response to determining that validation of addition of clusters is to be performed.

14. The computer implemented method of claim 13, further comprising:

presenting, by the at least one micro-processor, the at least one second cluster in a second personalized interview or chat window to the specific user in the electronic tax return preparation and filing software application delivery model in response to determining that the at least one cluster is to be validated or modified; and adding, by the at least one micro-processor, the at least one first cluster in response to determining that the at least one first cluster is to be added.

15. A system for providing tax return information for an electronic tax return preparation and filing software application delivery model, comprising:

a computing system comprising at least one microprocessor including one or more processor cores executing one or more threads in the computing system; and a non-transitory computer accessible storage medium storing thereupon program code that includes a sequence of instructions that, when executed by the at least one microprocessor of the computing system, causes the at least one microprocessor at least to:

identify a plurality of business clusters and a plurality of expense categories for a plurality of business clusters;

extract a description about a first characteristic of a specific user from an electronic tax return in an electronic tax return preparation and filing software application delivery model, the description expressed in natural language;

generate a user description vector of at least a part of the description, the user description vector expressing the at least part of the description in a normalized form within a vector space;

determine one or more business clusters within the vector space for the specific user by matching the user description vector with the one or more business clusters within the vector space; and select one or more expense categories for the electronic tax return of the specific user based in part or in whole upon at least one association between the selected one or more expense categories and the matched one or more business clusters.

16. The system of claim 15, wherein the program code includes further instructions that, when executed by the at least one microprocessor or processor core, cause the at least one processor or processor core:

to identify a plurality of descriptions about a plurality of users accessing one or more versions of the electronic tax return preparation and filing software application delivery model into a corpus, to identify pertinent natural language information from respective electronic tax returns of the plurality of users, to normalize at least one of the corpus and the pertinent natural language information into normalized corpus comprising a plurality of unique tokens, and to transform the normalized corpus into a plurality of vector representations in a vector space for the plurality of users.

17. The system of claim 16, wherein the program code includes further instructions that, when executed by the at least one micro-processor or processor core, cause the at least one processor or processor core:

to determine a plurality of business clusters for the plurality of user by using at least the plurality of vector representations, to determine a plurality of expense categories for the plurality of business clusters by using at least the plurality of business clusters, to identify the description about the specific user from the electronic tax return of the specific user, and to identify additional natural language information about the specific user from a software application flow of the electronic tax return preparation and filing software application delivery model.

18. The system of claim 17, wherein the program code includes further instructions that, when executed by the at least one micro-processor or processor core, cause the at least one processor or processor core:

to normalize at least one of the description and the additional natural language information into normalized information comprising one or more unique tokens, to transform the normalized information into a specific vector representation in the vector space for the specific user, to determine a set of business clusters for the specific user by using at least the specific vector representation, to rank the set of business clusters into a set of ranked business clusters based in part or in whole upon one or more first criteria, and to select the one or more business clusters for the specific user from the set of business clusters or the set of ranked business clusters.

19. The system of claim 18, wherein the program code includes further instructions that, when executed by the at least one micro-processor or processor core, cause the at least one processor or processor core:

to identify one or more expense categories for the specific user based in part or in whole upon the set of business clusters or the set of ranked business clusters, to rank the one or more expense categories into one or more ranked expense categories based in part or in whole upon one or more second criteria, and to present at least one expense category of the one or more expense categories or the one or more ranked expense categories to the software application flow for the specific user.

20. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for providing tax return information for an electronic tax return preparation and filing software application delivery model, the set of acts comprising:

identifying, by at least one micro-processor of a computing system, a plurality of business clusters and a plurality of expense categories for the plurality of business clusters;

extracting, by the at least one micro-processor of a computing system, description about a first characteristic of a specific user from an electronic tax return in an electronic tax return preparation and filing software application delivery model, the description expressed in natural language;

generating, by the at least one micro-processor, a user description vector of at least a part of the description, the user description vector expressing the at least part of the description in a normalized form within a vector space;

determining, by the at least one micro-processor, one or more business clusters from a plurality of business clusters within the vector space for the specific user by matching the user description vector with the one or more business clusters within the vector space; and selecting, by the at least one micro-processor, one or more expense categories for the electronic tax return of the specific user based in part or in whole upon at least one association between the selected one or more expense categories and the matched one or more business clusters.

21. The article of manufacture of claim 20, the set of acts further comprising:

identifying one or more first expense clusters from the electronic tax return of the specific user and one or more first business clusters into which the specific user is classified;

identifying additional natural language information about the specific user; and identifying current or historical data from the specific user or a plurality of users in the one or more first business clusters with the specific user.

22. The article of manufacture of claim 20, the set of acts further comprising:

determining additional pertinent data pertaining to the one or more first expense categories at least by embedding at least one of the additional natural language information and the current or historical data into one or more additional vector representations in the vector space; and performing a first anomaly check on at least one of the one or more first expense clusters and the one or more first business clusters using at least the one or more additional vector representations.

23. The article of manufacture of claim 22, the set of acts further comprising:

determining whether at least one first cluster is to be removed based in part or in whole the additional pertinent data that comprises one or more similarity metrics between the one or more additional vector representations and at least one of the one or more first expense clusters and the one or more first business clusters;

validating whether removal of the at least one first cluster is to be performed for the specific user in response to determining that validation of removal of clusters is to be performed;

presenting the at least one first cluster in a first personalized interview or chat window to the specific user in the electronic tax return preparation and filing software application delivery model in response to determining that the at least one cluster is to be removed; and removing the at least one first cluster in response to determining that the at least one first cluster is to be removed.

24. The article of manufacture of claim 22, the set of acts further comprising:

determining whether at least one second cluster is to be added for the specific user based in part or in whole the additional pertinent data that comprises the one or more similarity metrics between the one or more additional vector representations and the description about the first characteristic of the specific user;

validating whether addition of the at least one second cluster is to be performed for the specific user in response to determining that validation of addition of clusters is to be performed;

presenting the at least one second cluster in a second personalized interview or chat window to the specific user in the electronic tax return preparation and filing software application delivery model in response to determining that the at least one cluster is to be validated or modified; and adding the at least one first cluster in response to determining that the at least one first cluster is to be added.

* * * * *